US010489806B2

(12) United States Patent
Nadiadi et al.

(10) Patent No.: US 10,489,806 B2
(45) Date of Patent: Nov. 26, 2019

(54) METHOD AND APPARATUS FOR GENERATING AND CONVERTING SALES OPPORTUNITIES

(71) Applicant: Level 3 Communications, LLC, Broomfield, CO (US)

(72) Inventors: Yunas Nadiadi, Superior, CO (US); Paul Farnsworth, Castle Rock, CO (US); Jeff Storey, Boulder, CO (US); Ajit K. Rao, Broomfield, CO (US); Eric D. Gundersen, Broomfield, CO (US); Allen E. Dixon, Erie, CO (US); Sanjiv Kumar, Erie, CO (US); Rene Grippo, Boulder, CO (US); Luke Philips, Denver, CO (US); Rajiv K. Singh, Thornton, CO (US); Chris Cuttitta, Golden, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 13/733,573

(22) Filed: Jan. 3, 2013

(65) Prior Publication Data

US 2013/0179224 A1 Jul. 11, 2013

Related U.S. Application Data

(60) Provisional application No. 61/584,179, filed on Jan. 6, 2012, provisional application No. 61/584,193, filed
(Continued)

(51) Int. Cl.
*G06Q 30/00* (2012.01)
*G06Q 30/02* (2012.01)
(Continued)

(52) U.S. Cl.
CPC ....... *G06Q 30/0205* (2013.01); *G06F 3/0481* (2013.01); *G06Q 30/00* (2013.01);
(Continued)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS 5,559,707 A * 9/1996 DeLorme et al. ............ 701/467
D436,580 S 1/2001 Navano et al.
(Continued)

FOREIGN PATENT DOCUMENTS

WO WO2011/031795 * 3/2011 ............. G06Q 30/02
WO WO-2011031795 A1 3/2011

OTHER PUBLICATIONS

Albers .et al., Models for Sales Management Decisions, Handbook of Marketing Decision Models. (Year: 2008).*
(Continued)

*Primary Examiner* — Mehmet Yesildag
*Assistant Examiner* — Uche Byrd

(57) ABSTRACT

Implementations of the present disclosure involve a system and/or method of displaying and reviewing prospective customers. The system and/or method may display a prospect map showing geographic areas, corresponding technical infrastructure, and prospects present in the areas. The prospect displayed may be adjusted based on user defined prospect attributes.

31 Claims, 21 Drawing Sheets

Related U.S. Application Data on Jan. 6, 2012, provisional application No. 61/584,203, filed on Jan. 6, 2012.

(51) Int. Cl.
  *G06Q 30/06* (2012.01)
  *G06Q 40/00* (2012.01)
  *G06F 3/0481* (2013.01)

(52) U.S. Cl.
  CPC ............ *G06Q 30/02* (2013.01); *G06Q 30/06* (2013.01); *G06Q 40/00* (2013.01)

(58) Field of Classification Search
  CPC .. G06Q 30/02; G06Q 10/06315; G06Q 40/00; G06Q 30/00; G06Q 30/06; H04Q 7/20
  See application file for complete search history.

(56) References Cited

U.S. PATENT DOCUMENTS

| | | | |
|---|---|---|---|
| D437,858 S | 2/2001 | Yasui et al. | |
| 6,346,951 B1 | 2/2002 | Mastronardi | |
| D461,820 S | 8/2002 | Wasko et al. | |
| 6,697,086 B2 | 2/2004 | Rosenberg et al. | |
| 6,971,070 B2 | 11/2005 | Obradovich | |
| 7,091,948 B2 | 8/2006 | Chang et al. | |
| 7,113,949 B1* | 9/2006 | House | H04L 41/12 |
| D589,970 S | 4/2009 | Bhat et al. | |
| D590,413 S | 4/2009 | Bhat et al. | |
| D595,304 S | 6/2009 | Rasmussen et al. | |
| D621,846 S | 8/2010 | Rasmussen et al. | |
| 7,916,142 B2 | 3/2011 | Carroll | |
| 8,145,703 B2 | 3/2012 | Frishert et al. | |
| D656,946 S | 4/2012 | Judy et al. | |
| D658,667 S | 5/2012 | Cho et al. | |
| 8,427,437 B2 | 4/2013 | Chae et al. | |
| 8,473,846 B2 | 6/2013 | Ubillos et al. | |
| 8,493,408 B2 | 7/2013 | Williamson et al. | |
| 8,533,620 B2 | 9/2013 | Hoffman et al. | |
| D697,934 S | 1/2014 | Lee et al. | |
| 8,732,193 B2 | 5/2014 | Skeen et al. | |
| 8,806,373 B2 | 8/2014 | Yamamoto et al. | |
| 2002/0055928 A1 | 5/2002 | Worthington et al. | |
| 2003/0065557 A1* | 4/2003 | Hoffman | G06Q 10/06 705/14.46 |
| 2004/0039675 A1* | 2/2004 | Wallman | G06Q 40/00 705/36 R |
| 2004/0138965 A1 | 7/2004 | Laughlin et al. | |
| 2005/0055337 A1 | 3/2005 | Bebo et al. | |
| 2005/0288957 A1* | 12/2005 | Eraker | G06Q 30/00 345/630 |
| 2007/0055939 A1 | 3/2007 | Furlong et al. | |
| 2007/0124695 A1 | 5/2007 | Brodie et al. | |
| 2007/0192728 A1 | 8/2007 | Finley et al. | |
| 2008/0103946 A1 | 5/2008 | Johnson et al. | |
| 2008/0140718 A1 | 6/2008 | Evans et al. | |
| 2008/0312951 A1* | 12/2008 | Herpichboehm | G06F 19/3481 705/2 |
| 2009/0083113 A1 | 3/2009 | Ortega | |
| 2009/0100342 A1 | 4/2009 | Rueben et al. | |
| 2009/0132929 A1 | 5/2009 | Reed et al. | |
| 2009/0149200 A1* | 6/2009 | Jayasinghe | H04W 4/001 455/456.3 |
| 2009/0158136 A1 | 6/2009 | Rossano et al. | |
| 2009/0287701 A1 | 11/2009 | Breaker et al. | |
| 2009/0327885 A1 | 12/2009 | Aoki et al. | |
| 2010/0005067 A1 | 1/2010 | Howard et al. | |
| 2010/0114985 A1 | 5/2010 | Chaudhary et al. | |
| 2010/0115407 A1 | 5/2010 | Kim et al. | |
| 2010/0138742 A1 | 6/2010 | Holm et al. | |
| 2010/0185385 A1 | 7/2010 | Philbin et al. | |
| 2011/0010624 A1 | 1/2011 | Vanslette et al. | |
| 2011/0010650 A1 | 1/2011 | Hess et al. | |
| 2011/0125755 A1 | 5/2011 | Kaila et al. | |
| 2011/0261380 A1 | 10/2011 | Kwon | |
| 2011/0283210 A1 | 11/2011 | Berger et al. | |
| 2012/0054617 A1 | 3/2012 | Bachman et al. | |
| 2012/0059576 A1 | 3/2012 | Lee et al. | |
| 2012/0171653 A1 | 7/2012 | Kwon et al. | |
| 2012/0254716 A1 | 10/2012 | Choi et al. | |
| 2013/0047081 A1 | 2/2013 | Long et al. | |
| 2013/0047083 A1 | 2/2013 | Sansom et al. | |
| 2013/0097544 A1 | 4/2013 | Parker et al. | |
| 2013/0179224 A1 | 7/2013 | Nadiadi et al. | |
| 2013/0179790 A1 | 7/2013 | Nadiadi et al. | |
| 2013/0262998 A1 | 10/2013 | Suzuki | |
| 2013/0318437 A1 | 11/2013 | Jung et al. | |
| 2013/0332877 A1 | 12/2013 | Florance et al. | |
| 2013/0339868 A1 | 12/2013 | Sharpe et al. | |
| 2014/0026088 A1 | 1/2014 | Monte | |
| 2014/0059431 A1 | 2/2014 | Svendsen et al. | |
| 2014/0059433 A1 | 2/2014 | Ady et al. | |
| 2014/0068438 A1 | 3/2014 | Hillebrandt | |
| 2014/0075310 A1 | 3/2014 | Li | |
| 2014/0123006 A1 | 5/2014 | Chen et al. | |
| 2014/0129941 A1 | 5/2014 | Sato et al. | |
| 2014/0149864 A1 | 5/2014 | Tanaka et al. | |
| 2014/0211933 A1 | 7/2014 | Vymenets et al. | |
| 2014/0233719 A1 | 8/2014 | Vymenets et al. | |
| 2014/0245158 A1 | 8/2014 | Greenberg et al. | |
| 2014/0282218 A1 | 9/2014 | Kaufman et al. | |

OTHER PUBLICATIONS

U.S. Appl. No. 29/441,465, filed Jan. 4, 2013, entitled "Graphical User Interface for a Display Screen or Portion Thereof".
U.S. Appl. No. 29/441,467, filed Jan. 4, 2013, entitled "Graphical User Interface for a Display Screen or Portion Thereof".
U.S. Appl. No. 29/441,468, filed Jan. 4, 2013, entitled "Graphical User Interface for a Display Screen or Portion Thereof".
International Search Report, dated Mar. 12, 2013, Int'l Appl. No. PCT/US13/020164, Int'l Filing Date Jan. 3, 2013, 3 pgs.
Written Opinion, dated Mar. 12, 2013, Int'l Appl. No. PCT/US13/020164, Int'l Filing Date Jan. 3, 2013, 12 pgs.
International Preliminary Report on Patentability, dated Jul. 8, 2014, Int'l Appl. No. PCT/US13/020164, Int'l Filing Date Jan. 3, 2013; 14 pgs.
Canadian Examination Report, dated Nov. 19, 2018, Application No. 2,860,658, filed Jan. 3, 2013; 2 pgs.

* cited by examiner

METHOD AND APPARATUS FOR GENERATING AND CONVERTING SALES OPPORTUNITIES

CROSS-REFERENCE TO RELATED APPLICATIONS

This application claims priority under 35 U.S.C. § 119(e) to provisional patent application No. 61/584,203 titled "APPARATUS, SYSTEM AND METHOD FOR GENERATING AND CONVERTING SALES OPPORTUNITIES", provisional patent application No. 61/584,179 titled "APPARATUS, SYSTEM AND METHOD FOR GENERATING AND CONVERTING SALES OPPORTUNITIES", and provisional patent application 61/584,193 titled "APPARATUS, SYSTEM AND METHOD FOR GENERATING AND CONVERTING SALES OPPORTUNITIES," all three filed on Jan. 6, 2012 and all three of which are hereby incorporated by reference herein.

FIELD OF THE DISCLOSURE

Aspects of the present disclosure relate to an apparatus, system, and method for generating and converting sales opportunities. More specifically, the present disclosure is directed towards a computer system that assists sales, marketing and other teams to access, manage and manipulate data relevant to identifying and converting sales and other business opportunities.

BACKGROUND

The identification and capitalization of sales opportunities can be a long and complicated process. This is especially true in the modern world where sales associates are often tasked with increasingly complex products and geographic territories. Sales associates are often required to travel to various customer locations oftentimes in unfamiliar cities, states, or countries. Such geographical challenges coupled with the ever-changing nature of customer situations and technology in general, identifying customer needs and potential solutions becomes a complicated task.

Technology has provided sales associates with systems for keeping track of customer problems, new technologies, and company offered solutions. However, this system and the related information are often only provided on proprietary servers accessible only through the private intranets. Thus, when a sales associate is traveling or otherwise away form the office, he often does not have access to the same information that he would have access too when at a company location.

In some cases, company information may be remotely accessed over the Internet, but in many cases, proprietary information is not easily accessible. Sometimes, proprietary company information may be accessed by connecting to the Internet and using a virtual private network (VPN) that extends a private network allowing for remote access to such proprietary information. However, while overall effective, access to a sufficient Internet connection can limit the effectiveness of VPN's. As cellular networks providing data capabilities and other data networks, such as Wi-Fi, have improved and become more widely available, it has become possible to access the Internet using such networks. Using a cellular connection, sales associates are able to access VPNs and therefore access vital information. Oftentimes, however, such networks do not provide sufficient reliability, coverage or the like, in all of an associate's territory. In these cases, a sales associate cannot readily access company information.

It is with these and other issues in mind that various aspects of the present disclosure were developed.

SUMMARY

Aspects of the present disclosure involve apparatus, systems and methods for generating and converting sales opportunities. In one particular example, that will be discussed herein to illustrate various inventive concepts set out in the present disclosure, the apparatus and system involve an app and various possible graphical user interfaces (GUI's) running on some form of smart tablet type computing device (e.g., iPad™, Android™, Surface™), which may have limited memory, and one or more back-end server devices and databases accessible over some form of network and running various applications and storing various types of data accessible with the smart tablet device and particularly the application or applications running thereon. Aspects of the present disclosure involve an application that includes several computing modules. In one example, the application a prospect module for identifying prospective customers.

The prospect module may be configured to show prospective customers on a map along with technical infrastructure. The prospective customers may be shown according to a variety of criteria describing the potential value of the customer and any costs associated with the customer. A user may navigate the map to selected areas and the prospect module will populate the geographic data for the map along with the technical infrastructure and the prospective customers in the area. The user may have the option of filtering the prospective customers that are displayed so that they can narrow down the prospects to the highest value prospects. These and other aspects of the present disclosure are discussed in more detail below.

BRIEF DESCRIPTION OF THE DRAWINGS

FIG. 1 is an illustration of a sample environment that the present disclosure may operate in.

DETAILED DESCRIPTION

Aspects of the present disclosure involve a system, an apparatus, and methods for enhancing the ability of a mobile sales force to generate and convert sales opportunities. This includes supplying the sales force with relevant customer, product, and service information as well as tools for facilitating increased sales performance. The apparatus for enhancing mobile sales may include an application running on a computing device. Similarly, the system may involve the application and related information and access to such information used and manipulated by the application, among other things. The application may include various graphical user interfaces (GUI's) connected to one or more data sources located on the computing device, located in a remote location and accessible by way of a network, as well as a combination of locally and remotely located information. The various GUI's may be configured to facilitate the use of the application's various functions. While interactive and interrelated, each of these functions may be separated into distinct program modules. For example, the system may include a mobile sales application involving a learn module, a prospect module, a present module, a quote module, and a customers module. These various program modules may operate virtually independently from each other, like individual computer programs accessed through a common interface, or they may work cooperatively with each other by sharing user input and information with in order to facilitate a better and more effective user experience.

In the present specification, the various modules are presented in the context of an integrated application providing a comprehensive and unique user experience. Moreover, the system is presented in the context of a tool for use in a telecommunications environment involving telecommunications related services and infrastructure. However, the various features and modules may be provided in various possible combinations or independently, and such modules may be used and or otherwise deployed and configured for other operating environments besides telecommunications.

Figure 1:
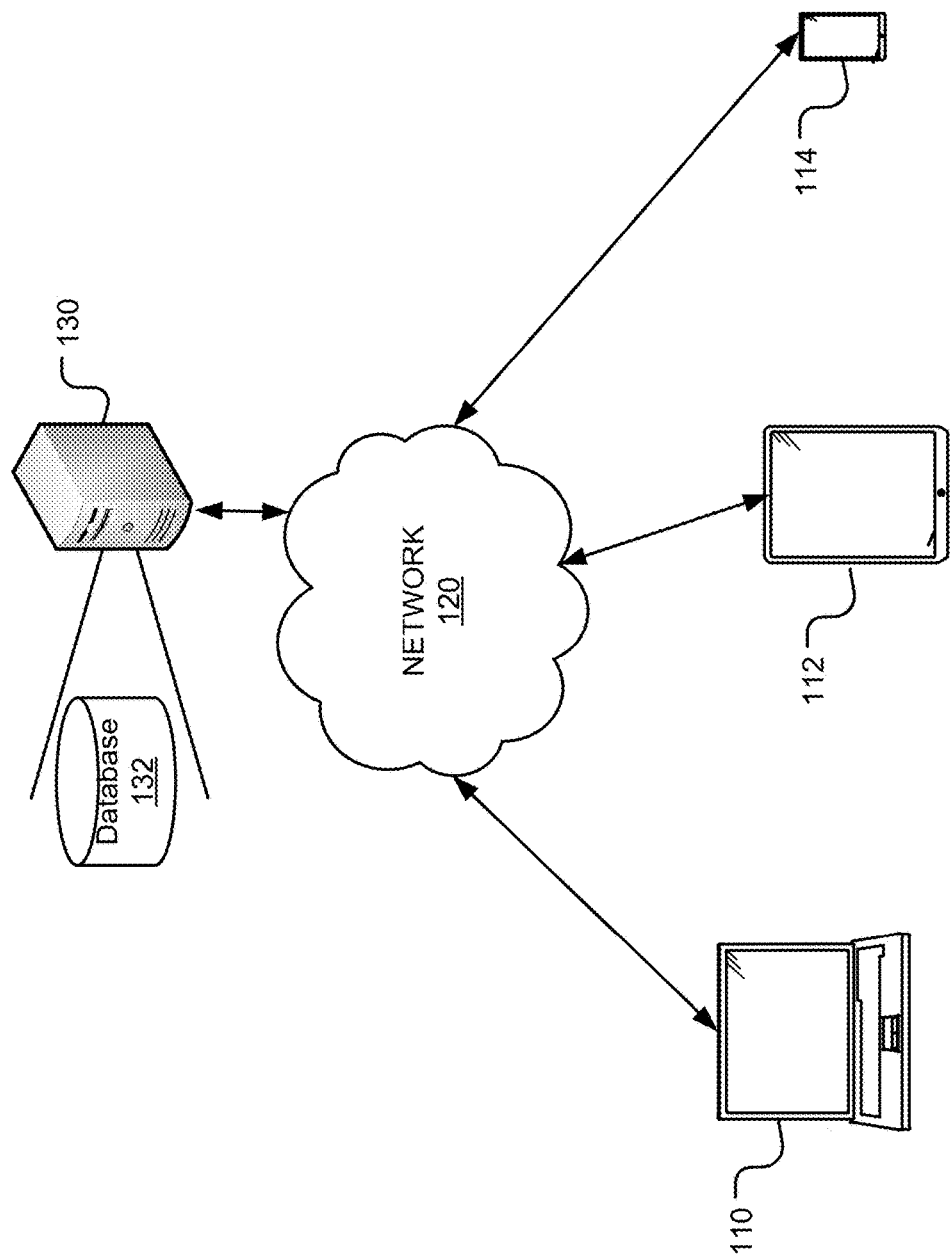

Referring to FIG. 1, a sample computing environment 100 is depicted. In various embodiments, the application may be configured to operate on a general computing device such as a laptop computer 110, a tablet computer 112 (e.g., iPad™, Android™, Surface™), a smart phone 114 (e.g., iPhone®, Android™, Windows Phone™), or any other computing device capable of running a computer application that displays information, receives user input, and connects to a network 120. The network 120 may be any type of computer network including a local intranet and the Internet. In some cases, the network 120 may include the Internet along with a VPN connected to a company's private network. In many cases, the computing device 110-114 may be capable of connecting to one or more servers 130 and databases 132 accessible over the network 120. The computing device 110-114 may connect to the network 120 in any manner, including conventional 802.11 wireless networks and various cellular networks such as GSM, CDMA, HSPA+, LTE, or any other cellular network. The computing devices 110-114 may also be capable of running various applications and storing various types of data accessible with the computing device and particularly the application or applications running.

Figure 2:
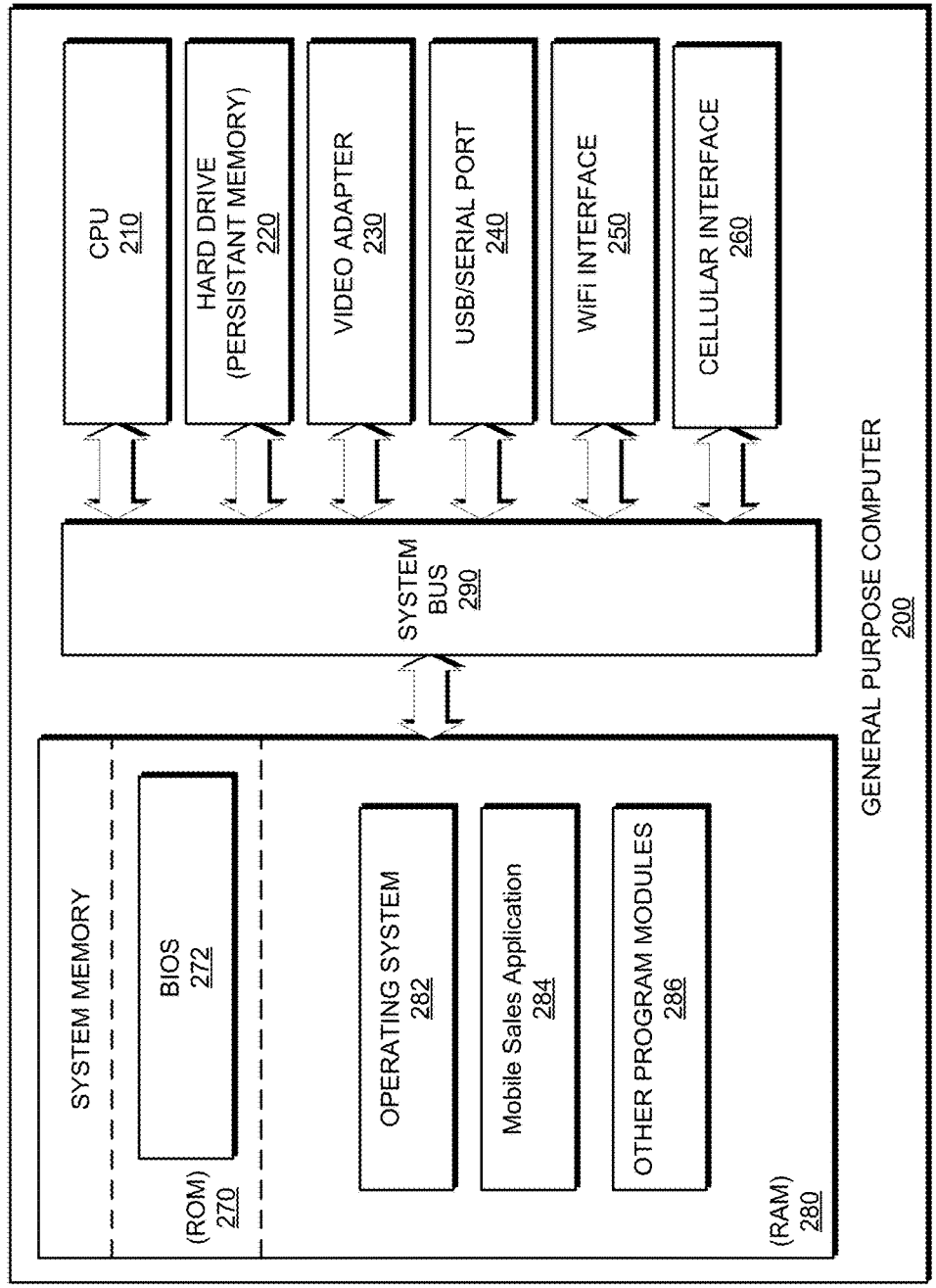
FIG. 2 is an illustration of a general purpose computer that may be used in accordance with the present disclosure in the sample environment.

The computing devices 110-114 may include any general purpose computer with the ability to operate the application and connect to a network. For example, FIG. 2 provides a sample general purpose computer 200 that may be useful in implementing the described technology. The example hardware and operating environment of FIG. 2 for implementing the described technology includes a computing device, such as general purpose computing device in the form of a personal computer, tablet computer, laptop, smart phone, or other type of computing device. In the implementation of FIG. 2, for example, the computing device 200 includes a processor 210, a cache 260, a system memory 270, 280, and a system bus 290 that operatively couples various system components including the cache 260 and the system memory 270, 280 to the central processing unit (CPU) 210. There may be only one or multiple CPUs 210, or the CPU 210 may include one or more multi-core processors. The computing device 200 may be a conventional computer, a portable computer, a tablet computer, a smart phone or any other type of computer; the invention is not so limited. For example, tablet computers and smart phones may not include all of the features of the general purpose computer 200 or may include new or updated features. For example, the bios may be replaced with a newer standard such as the Unified Extensible Firmware Interface (UEFI). Furthermore, tablet computers and smart phones may not employ traditional spinning hard drives, but instead utilize stolid state memory such as FLASH memory.

The system bus 290 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 270 and random access memory (RAM) 280. A basic input/output system (BIOS) 272, containing the basic routines that help to transfer information between elements within the computing device 110-114 such as during start-up, is stored in ROM 270. The computing device 200 further includes a disk drive 220 for reading from and writing to a persistent memory such as a hard disk, not shown.

The hard disk drive 220 is connected to the system bus 290. The drive and their associated computer-readable media provide nonvolatile storage of computer-readable instructions, data structures, program engines and other data for the storage system 200. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, ROM 270, or RAM 280, including an operating system 282, a mobile sales application 284, and one or more other programs 286. A user may enter commands and information into the computing device 200 through input devices such as a touch screen, a keyboard, and pointing device connected to the USB or Serial Port 240. These and other input devices are often connected to the processor 210 through the USB or serial port interface 240 that is coupled to the system bus 290, but may be connected by other interfaces, such as a parallel port. A monitor or other type of display device may also be connected to the system bus 290 via an interface, such as a video adapter 230. In addition to the monitor, computers typically include other peripheral output devices (not shown), such as speakers and printers.

The computing device 200 operates in a networked environment using logical connections to one or more remote computers. These logical connections are achieved by a network interface coupled to or a part of the computing device 200. In this example, the computing device 200 includes both a wireless or Wi-Fi interface 250 and a cellular interface 260. This disclosure is not limited to a particular type of network interface. The computing device 200 may connect to any remote computer. The remote computer may be another computer, a server, a router, a network PC, a client, a peer device, a network storage appliance, or other common network node, and typically includes many or all of the elements described above relative to the computing device 200. The logical connections include a local-area network (LAN) a wide-area network (WAN), or any other network. Such networking environments are commonplace in office networks, enterprise-wide computer networks, intranets and the Internet, which are all types of networks. It is appreciated that the network connections shown are example and other means of and communications devices for establishing a communications link between the computers may be used.

Figure 3:
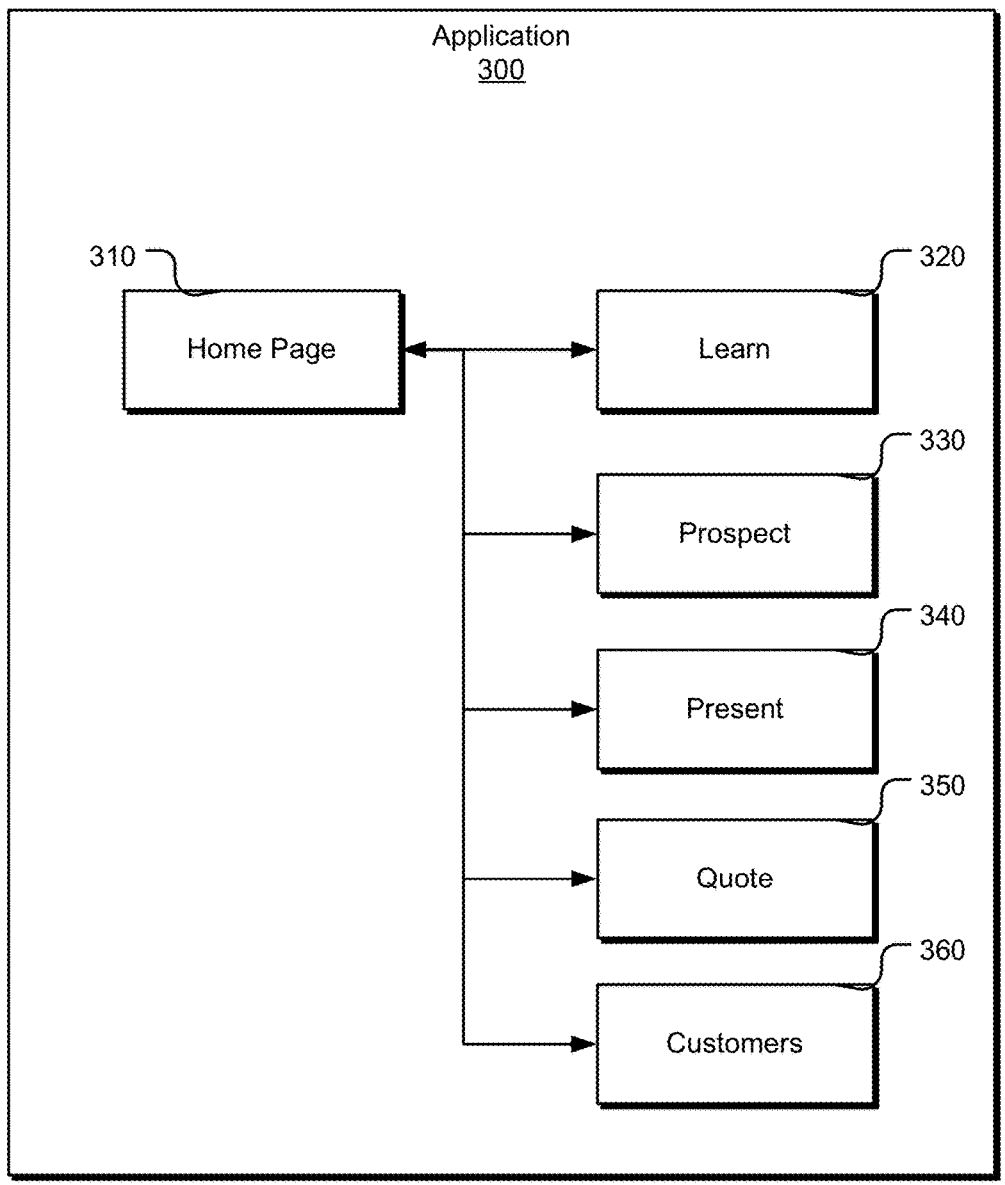
FIG. 3 illustrates sample architecture of a mobile sales application that includes multiple program modules directed towards performing specific tasks.

FIG. 3 is diagram depicting an overview of the mobile sales application 300 architecture and includes some major modules of the mobile application. In this embodiment, the mobile sales application 300 includes a home page 310 for logging into the system and navigating to the various features and modules. In this example, the mobile sales application includes a learn module 320, a prospect module 330, a present module 340, a quote module 350, and a customers module 360. In this example, the learn module 320 may be configured to provide the sales associate with a single point of access to information about the application and company technologies, as well as current events and public and non-public information about customers and potential customers. The prospect module 330 may be configured to associate new and/or existing customer opportunities with technical infrastructure. The present module 340 may be configured for building and displaying a presentation in near real-time. The quote module 350 may be configured for generating and delivering a quote for goods and services, where the quote is delivered at the point of sale rather than at some later point in time. The customer module 360 may be configured for accessing and managing customer accounts. Each of the modules 320-360 may also be configured to share information and functionality between other modules as will be discussed in more detail below.

Figure 4:
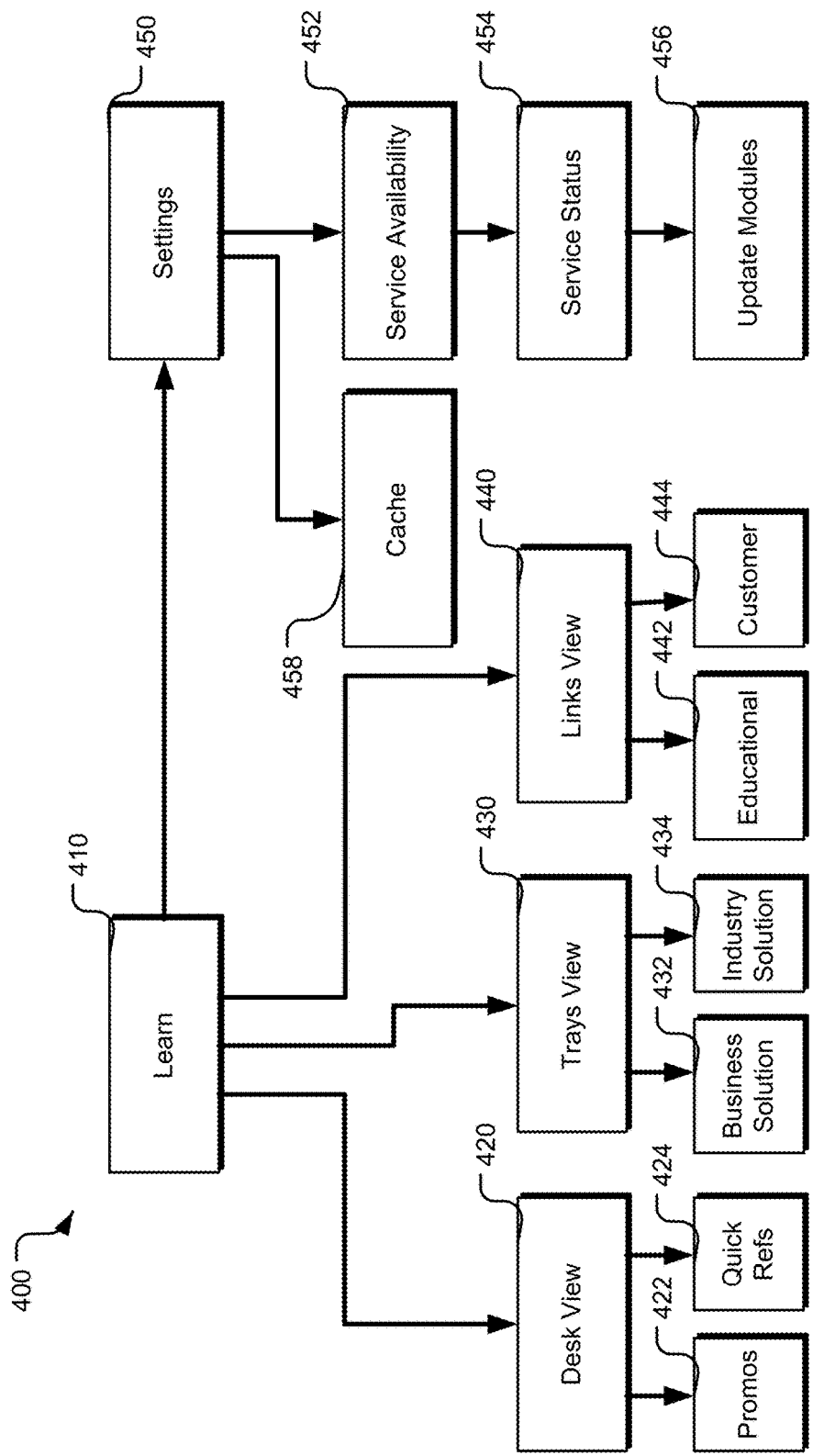
FIG. 4 is an illustration of the architecture and functions of a learn module operating in accordance with the present disclosure.

Referring to FIG. 4, a system flow diagram illustrating the operations and computing components associated with one possible implementation of the learn module 400 is depicted. Generally speaking, the learn module 400 provides the user with a single point of access to information related to the application, the various modules, and acts as an information portal to access information and data from a public network (e.g. Internet), a proprietary internal network, either by connecting directly to that network or via a VPN. In other words, the learn module 400 provides the sales associate with access to key internal and external websites and content providing information concerning sales strategies, products, services, customers, potential customers and other information Upon launching the application, the learn module 400 is initially run and presents a learn home page 410. The learn home page 410 provides the user with the ability to navigate to the various aspects of the learn module 400, as well as other aspects of the application. For example, the learn module 400 may provide a desk web view 420, a trays web view 430, and a links web view 440.

The various views 410-440 may include information and data sources pre-configured to include information that is relevant to all users and may also be customizable by a particular user in order to optimize the effectiveness of the application. For example, in the case of a sales person selling products and services for a telecommunications and network provider, the application may be optimized to provide the user with access to content associated with the products and services provided, such as data and Internet services, voice services, video services, collocation services, and other similar services.

In other examples, the learn module 400 may include information from one or more daily sales news sites that provides the user with a single point of access to RSS feeds from relevant news sites, industry sites, company sites, relevant blogs, and even internal proprietary content (through VPN, Intranet connections, or other external connections), which may require login credentials. For example, the learn module 400 may query external databases and websites for information and may either load the information directly on the computing device or load a portion of the information, such as a headline or an excerpt, to the computing system's cache and display the portion. The various sources used by the learn module 400 may be set by a system administrator, and/or may be edited by the user. Selecting any link will launch a detailed view of the linked content (text, images, links, video, etc.). The learn module 400 may also provide the sales associate with real-time or nearly real-time updates related to various promotions and discounts that the sales associate may offer to prospective customers. In some cases, promotions and discounts may be loaded through an Internet or VPN accessible proprietary GUI. The learn module 400 may be configured to query an external data source for the most current promotions and discounts to display.

Some functions of the learn module 400 may allow a user to obtain specific product and service offerings, as well as information concerning the same, based on industry needs, customer needs, and the information may also include collateral to fully educate the user on the full spectrum of products and services that any particular customer may need or desire and places them into one easily accessible place that is automatically populated and linked to modules for taking advantage of the information. Besides accessing specific product or service information, the learn module 400 may be configured to provide the user with background information about the customer. For example, the learn module 400 may also be configured to automatically connect to one or more external websites that include information related to the financial data, such as market capital, debt, holdings, stock price, revenues of the customer or potential customer.

The learn module 400 may also be configured to connect to one or more social media websites related to specific customers or representatives for that customer using a built-in web browser such as Internet Explorer®, Firefox®, Chrome™, Safari™, or other Internet browser. For example, the learn module 400 may be configured to access a social network profile of the customer's representative, such as a LinkedIn® profile, by storing a link to the customer's profile and storing the user's login credentials, in this case, a username and password. In the case of incorrect or the user has not stored their login credentials, the learn module 400 may prompt the user for their username, password, or any other required information for accessing the social network, or may allow for the user to register for the social network. By accessing social media, the learn module 400 provides yet another way for the user to keep up to date with monitor customers activities as well as to quickly and easily find information about customer representatives.

The learn module 400 may also provide the user with access to internal training systems, the content associated with such training systems, and allow the user to track their progress through such training. The learn module 400 also accesses customer analytics information (e.g., trend graphs and external information sources), which may be through a secure log-in. In the case of log-in credentials, whether for the learn module 400 or other modules described herein, the application may be configured to require user entry of some or all credentials or may store some or all credential in a local cache, such as through a cookie mechanism or the like.

Another aspect of the learn module 400 allows a user to perform independent research about a customer. For example, the sales associate may browse Internet websites. The sales associate may then bookmark links to useful information, and may also associate the link, or content associated with the link, to a specific customer profile and the customer's location on a map. These bookmarks may be stored on the computing device and accessed at a later time by both the learn module and other relevant modules. For example, bookmarks that are associated with a specific customer may be linked to the customer's profile in the learn module 400, but may be accessed from the prospect module and customer module. As is discussed below, the prospect and customer modules include detailed customer information. The bookmarks may be added to and stored, either locally on the computing device cache or remotely in a database, with the customer information and included with the information when accessed by the other modules.

In the example depicted in FIG. 4, the various types of information accessible by the learn module 400 may be separated into categories to ease with navigation. For example, the desk view 420 may be configured to connect to a private intranet to access private company information. For example, the desk view 420 may connect to a database or server with current promotions 422, a server with an online helpdesk, and a database of quick reference cards 424 that concisely describe the various products, services, and solutions offered by the company. The trays view 430 may include links to a various web pages and resources at a company website. For example, an organization may post information regarding its available solutions 432, 434 and target markets for each solution on its private intranet sites and pages. Direct links to these pages may be found in the trays view 430. The links view 440 may include links to information only available on the company intranet and relevant links to outside Internet websites. For example, the links view 440 may include links to educational information 442 for training and customer sales information 444. The links view 440 may also include outside links that correspond to information relevant to the sales information, such as company financial information, and social network information.

The learn module 400 also allows a user to manage the settings 450 of the system. One aspect of the settings is the management of the internal cache memory 458 of the device running the various modules. As discussed below with reference to the present and prospect modules, some the modules access, display, and/or manipulate information associated with large data sets, such as global positioning system (GPS) mapping data and other geographic related data, and content rich information such as graphical data, video data, and audio data. Some of this data is cached on the computing device to enhance real-time display and performance of the system, as well as enhancing the performance of the system when the system is being used in an area of limited, sporadic or otherwise insufficient access to a network. The cached data may include thumbnail images, pictures, videos, PDFs, PowerPoint® presentations, and other documents. The cached data may be stored in a file system of the computing device. For example, with a computing device operating using iOS, the cache may be located in the operating system's core data.

In some implementations, at least some of the information is also stored remotely and loaded on an as-needed basis since the on-board cache and memory may be limited and the need for all information cannot be predicted in advance. Thus, the system allows the user to manage the cache by clearing some or all of the cache and or otherwise managing the data stored in the cache through complete or selective deletion. The length that information is stored in the cache may also be managed in a number of ways. For example, the user may set the maximum cache size in megabytes, the maximum file size that the system will cache, and time threshold for storing information in the cache. The limits may also be changed by the user during operation. For example, a maximum file size warning may be set so that if a file is too large, the user may override the size limit and download the file to cache. The system may also update the version of a file when an updated version becomes available. This may be done by including an external location of the file with the file or in a separate file that, for example, lists files that are checked for new versions.

The settings 450 also allow the user to monitor the availability of various services provided by the application. For example, if the computing device is not connected to the Internet or if a database used by the application is not available, the service availability 452 informs the service status 454 for each of the application's functions. For example, when the application is loaded, the service availability 452 may first determine whether the computing device is connected to a network, either via a cellular connection or a Wi-Fi connection. If the computing device is not connected to any network, the mobile sales application will not attempt to acquire any data for outside sources and may not allow the application to run certain features. If the computing device is connected to a network, the computing device may attempt to connect to each server, external database, and website required by the various modules by pinging or requesting some piece of information from each.

Depending on the response, or lack thereof, from each server, database, and website, the system may determine whether the server, database, or website is operational. The learn module 400 may be further configured to use the service status 454 to update the functions of the various modules 456. For example, if the computing device is not connected to the Internet, the computing device cannot load new data from outside sources. Using this information, the desk view 420, trays view 430, and links view 440 may not attempt to contact external data sources. Furthermore, the other modules, such as the prospect, present quote, and customer modules, may be prevented from needlessly attempting to connect to various outside data sources. For example, once a service has been determined to be non-operational, aspects associated with that service may no longer be offered. For example, if the learn module 400 is configured to retrieve news related data from the a news website and the computing device is not able to connect to the news website server because the computing device is not connected to a viable network or the news website's server is not operational, the system will not attempt to retrieve data from the news website server. In another example, if the computing device is not connected to a viable network, the mapping ability of the prospect module will not be able to load geographic data, infrastructure data, prospect data, or customer data beyond the data that is cached. In this case, the prospect module would not needlessly attempt to load new data. Similarly, the presentation module would not show presentation assets (described below) that are only available from external sources. By not giving the user the option of using presentation assets that are stored externally, the user saves the time and frustration associated with attempting to add presentation assets that cannot be added. Similarly, the customer module would be unable to create new customer leads on external websites.

Figure 5:
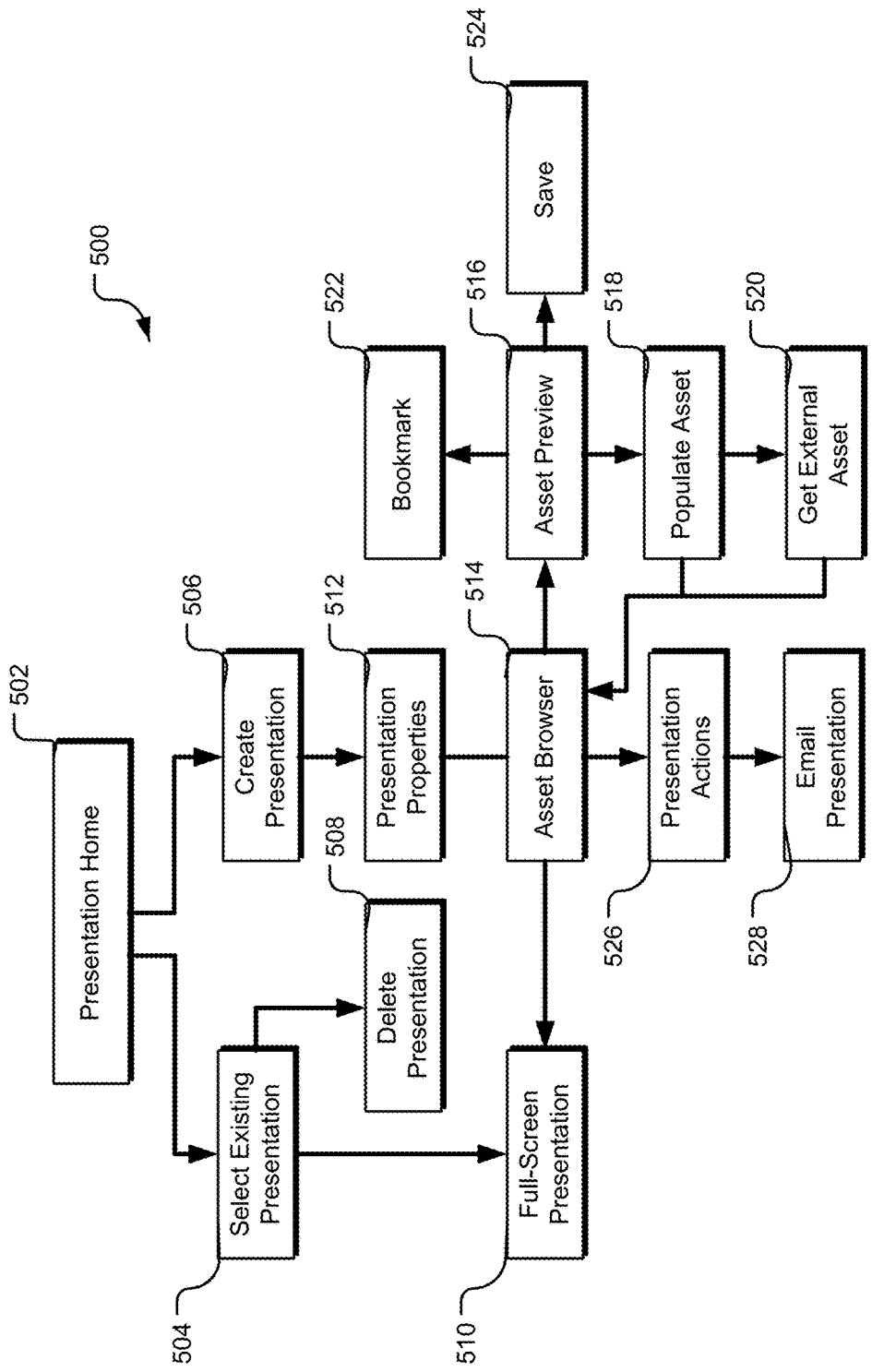
FIG. 5 is an illustration of the architecture and functions of a presentation module operating in accordance with the present disclosure.

Referring now to FIG. 5 an application flow diagram for the components and functions of the present module 500 is depicted. The present module 500 facilitates building and displaying a presentation in near real-time taking advantage of local caching and the prospective loading of remote content to provide the user with content that can be quickly and efficiently assembled into a presentation. The present module 500 may also be configured to operate with recognition that network connections may be intermittent, sporadic or otherwise unpredictable for a traveling sales associate or other remote user of the device. In the particular example illustrated, the present module 500 allows a sales associate to create and display a presentation on a mobile device, such a tablet computer, contemporaneously during a visit with a potential customer. Such functionality provides the user of the device with the ability to tailor a presentation to nearly whatever product or service the customer or potential customer may inquire.

In this example, a user activates the present module 500 and begins at a home or start page 502 and may either select an existing presentation 504 or elect to create a new presentation 506. When a user selects an existing presentation he has the option of viewing the presentation 510 or deleting it 508. When the user selects to create a new presentation 506, the presentation module 500 may first require the user to input certain required presentation properties 512 such as a customer name and logo, a presentation title, and information related to the subject of the presentation. For example, the presentation properties 512 may include a listing of available products, services, and solutions or categories of customers, and may require the user to select one or more products, solutions, or types of customers that the user is presenting to. Depending on the selection(s) made, the presentation module 500 may then assist in selecting materials corresponding to the products, solutions and types selected. For example, the presentation module 500 may allow the user to view materials based upon type of solution needed by the customer or by product name based on and what is likely relevant to a particular customer's needs and the offerings that the salesperson can provide. Each product, service, and customer may have specific or more generalized materials associated with it. Thus, when the user selects a product, service, or customer type, the presentation module 500 may automatically find materials that are associated with the selection(s).

For example, in the case of a high speed optical network provider, some products might include high performing websites, Internet broadcast elements, and low latency network connections, the solutions offered may be tailored for any industry, service, or client, and the client types might include governmental organizations, healthcare providers, content providers the user selects. If, for example, a high performance website for a healthcare provider, the present module may retrieve materials related to high performance websites and to products and services that generally interest healthcare providers.

The present module 500 provides a tool for generating highly tailored presentation targeted toward the needs of a particular customer. Thus, in one possible example, using the information supplied in the presentation properties 512, the present module 500 allows a user to generate an introductory slide with the company logo, presenter's name, customer logo and other information. The introductory slide template may be automatically pre-populated with some information, such as presenter name and company name, and allows the user to insert other information, such as the target client name. This may be achieved by retrieving information from one of the other modules. For example, the prospect and customer modules, as described below, are configured to store and access a variety of customer information. This may include the company name, address, logo, and representative names. The present module 500 may automatically access this information and use it to populate fields in the introductory slide or other slides.

In various examples, the presentation module 500 may facilitate the efficient development of a presentation by providing the user with various pre-fabricated presentation assets that can be placed into a presentation. Presentation assets may include PDF's, whitepapers, websites, videos, photos bookmarks, email attachments, and other files, and allowing the user to combine, sort, and show these files in a presentation. Depending on the product, solution, or client defined in the presentation properties 512 an asset browser 514 may be populated with corresponding presentation assets. These presentation assets may be stored in the cache, in a remote server or database, or both. In some cases, portions of assets or descriptions of the assets may be stored locally in the cache, while the rest of the asset is stored remotely. The asset browser 514 provides a listing of assets that the user may select for inclusion in the presentation. Individual assets may be selected and previewed by the user 516 before including the asset in the presentation. The asset browser 514 may also include the assets that are not stored in the memory of the computing device. When assets that are not located on the computing device are selected, the presentation module 500 may need to locally store the asset on the computing device 518. Depending on the location of the asset, the presentation module 500 may appropriately download the external asset from the source 520. In some cases, the computing device may not be connected to a network. As described above, the service availability 452 of the learn module 400 analyzes the computing device's network connection and can disable features. In this case, the service availability would inform the presentation module 500 of the lack of the connection, and the asset browser 514 would not populate assets that are only available from external sources. While viewing assets in the asset browser 514, an asset may be identified by the user as being important or for whatever reason, needing future review. For example, the user could find an asset that may or not fit into the presentation as it stands, but might be a good fit with some other changes. The presentation module 500 may allow for assets to be bookmarked 522 by the user so that the user can decide at a later time whether or not to include the asset. Once a presentation has been assembled, it may be saved 524 so that it may be shown at a later time. In some cases, it may be beneficial to email a presentation a customer. Emailing presentations 528 may also be done directly from the presentation module 500.

Figure 6:
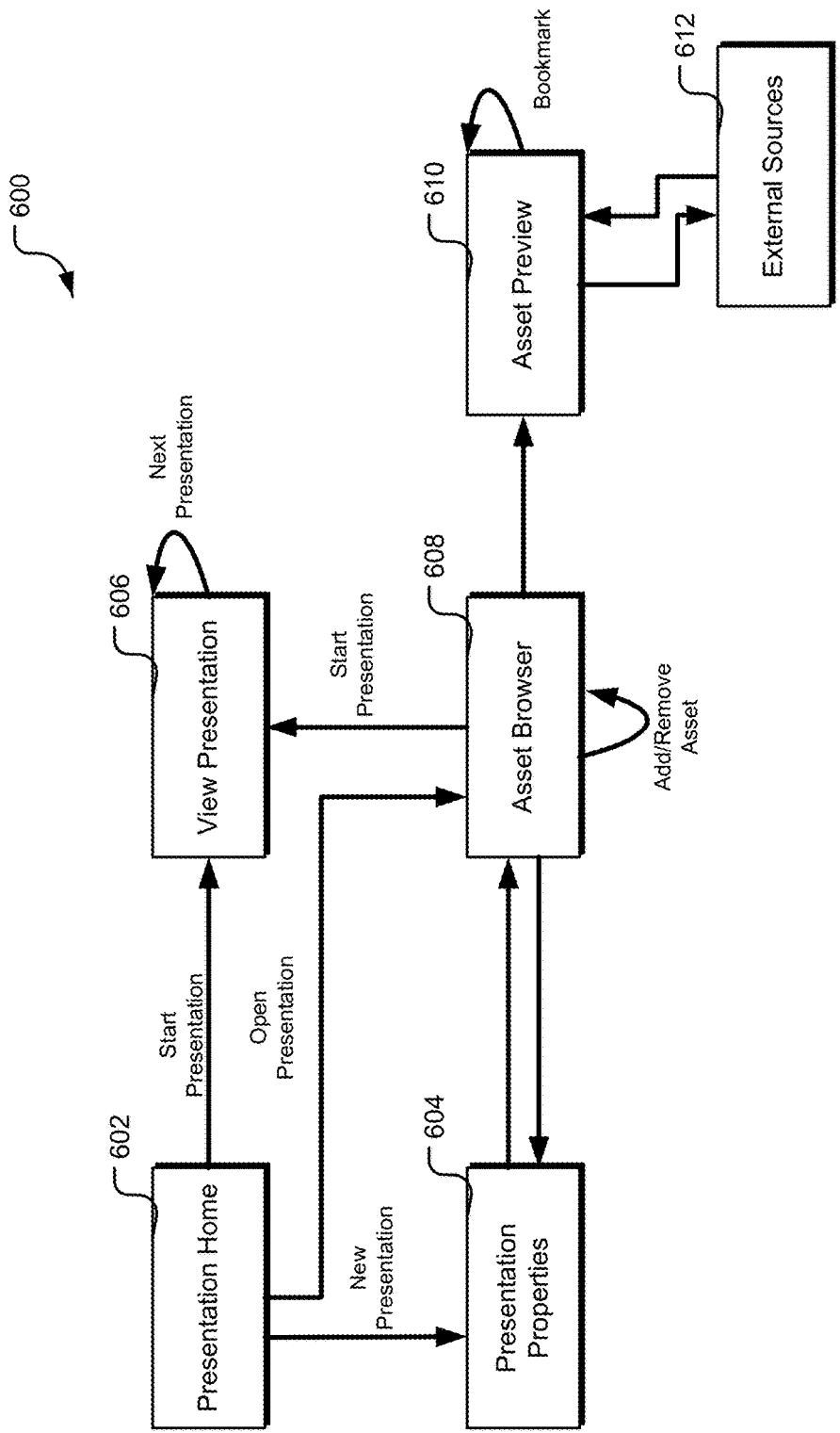
FIG. 6 is an illustration of the operation of the presentation module operating in accordance with the present disclosure.

Referring now to FIG. 6, a flow chart of the operation of the presentation module 600 is depicted. In this example, the user starts at a presentation home 602 and has the option of selecting an already completed presentation and viewing that presentation 606, or creating a new presentation and starting by filling out the various presentation properties 604. After the presentation properties have been entered, the asset browser 608 may be populated to show the assets to the user. The user may elect to preview complete versions of the assets 610 and add/remove assets from the presentation. Assets may be downloaded from external sources 612 when the user previews an externally located asset, or when the user adds the asset to the presentation. After the presentation is complete, the user has the option of saving the presentation, sharing the presentation via email, or viewing the presentation.

Figure 7:
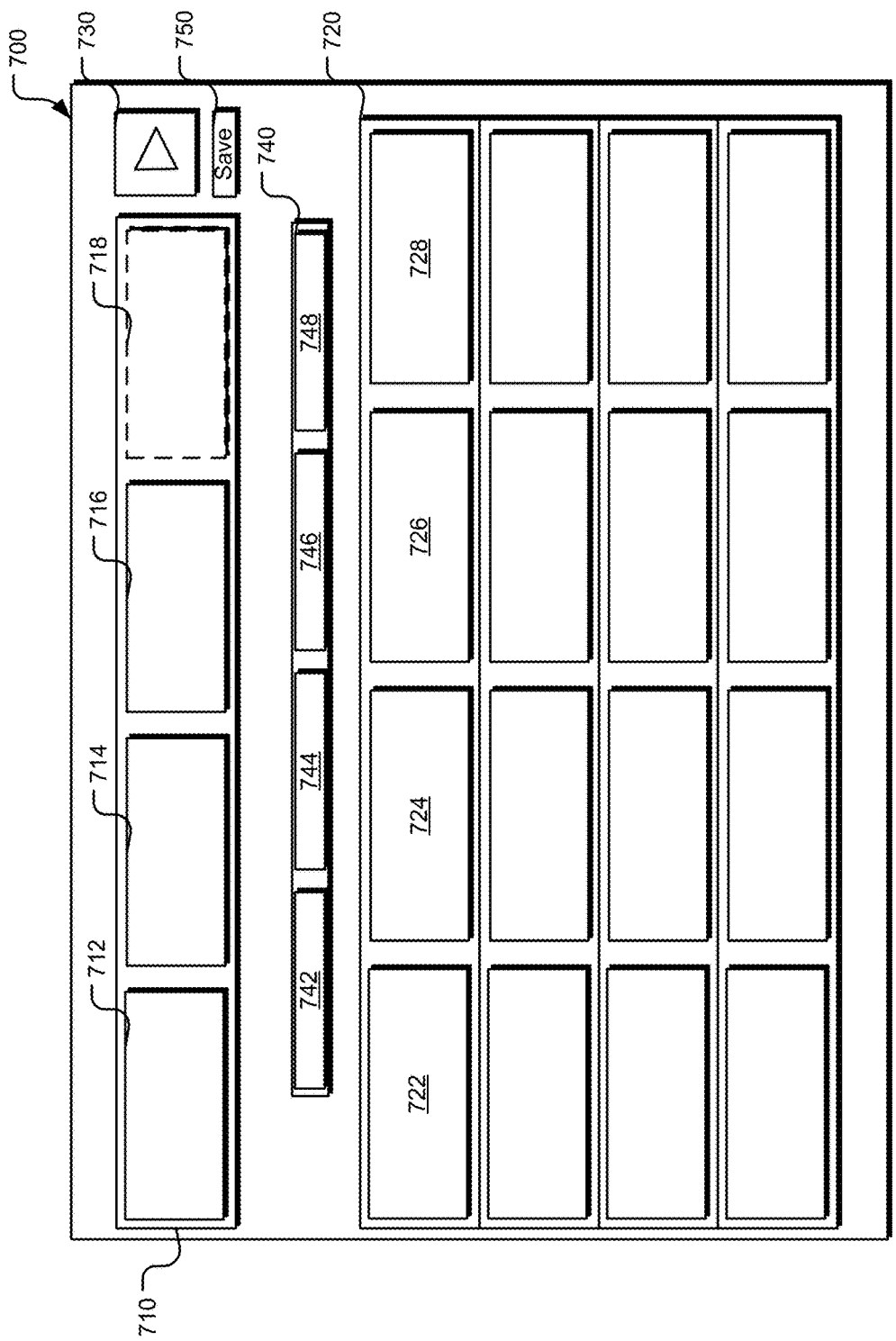
FIG. 7 is an illustration of the graphical user interface provided by the presentation module during operation.

Referring now to FIG. 7, a presentation board 700 for creating a new presentation is depicted. As discussed above, when creating a new presentation, a user may be prompted to provide presentation properties. After the user has defined the presentation properties, the application navigates to and displays the presentation board 700. In this example, the presentation board 700 is formatted in a grid layout and includes two main sections, the "pin-up board" 710 and an asset browser 720. In this case, the pin-up board 710 is located on the top portion of the presentation board 700, and includes an area where the user defines the presentation by dragging and dropping thumbnail images of assets 712-716 to create a presentation. The pin-up board 710 may act as a layout for the presentation. Each asset added to the pin-up board 710 becomes a part of the presentation, and the order of the presentation is defined by the order from left to right where the user populates assets in the pin-up board.

The asset browser 720 may include thumbnail images 722-728 associated with different forms of content, data and tools that may be included in the presentation. In various examples, the presentation may include discrete fixed or editable presentation slides, brochures, canned presentations, white papers, case studies, videos, calculators, tools and other forms of content. The thumbnails 722-728 may include images and/or text reflective of the content that may be included in the presentation and that will be included in the presentation if the thumbnail is moved to the pin-up board 710. So, for example, thumbnails reflective of a technical white paper will be different than thumbnails reflective of a short video clip or a thumbnail reflective of a tool that allows the user to calculate some parameter related a product or service.

In one example, the thumbnails 722-728 are presented based on the one or more products or solutions selected in the presentation properties. Thus, for example, for high performance websites various presentation content thumbnails associated with high performing websites will be shown on the asset browser 720. Stated differently, when the user initially defines the presentation properties, the user may select "high performance websites" from a drop down menu or other mechanism. Each asset is tagged or otherwise associated with various presentation properties or other information indicative of the type of service or product to which the asset relates. These tags may be provided in local cache or externally. Thus, the thumbnails are sorted and presented according to the relevance of the asset to the type of presentation being created. The first page of the presentation board may thus have the most relevant assets illustrated in the asset browser section, with other assets accessible from adjacent screens presented after some form of user action to navigate to those screens.

The asset browser 720 may not be limited simply to content directly associated with the identified products and/ or solutions. For example, additional asset categories 742-748 may be listed in an asset bar 740. A user may toggle different asset categories by selecting the category on the asset bar 740. For example, the proposed solution may be related to high performance websites, but the asset bar 740 may include asset categories related to total site performance, Internet services, and managed security. The system may also prioritize listing of such additional asset categories based on relevance to the primary focus of the presentation. Again, the assets may be tagged or otherwise organized based on primary as well as ancillary products and services. Such functionality allows the user to efficiently define and tailor the presentation not only the immediate inquiry of the customer but also to those related areas that the customer will likely also find interesting. Furthermore, asset browser 720 may be modified and customized based on the user's needs. For example, the user may be able to toggle between various types of additional content that may or may not be related to the product or solution, but are effective for giving presentations.

In the order to add the asset to the presentation, a user may drag various thumbnails into the presentation flow to define the presentation. Once the presentation is complete, the user may "save" the presentation, such as by touching the save icon 750. Selecting save, may cause the device to establish a network connection, if one is not already established, and access a remote storage, such as a server, through a browser or other means so that the module can obtain the content for the presentation and store the content locally, if the content is not already locally stored. Thus, for example, a sales associate may meet with a potential customer and learn of their specific needs and then build a content rich presentation tailored specifically for that customer. The sales associate only needs to be in an area with a network connection for a sufficient duration to load the data and store it locally. Some content may require VPN access or a network connection. The system is configured to automatically log into such proprietary systems and obtain the required information. Moreover, when a sufficient connection is established, the system may load and locally store and remote information while the user begins the presentation as long as the initial content is locally stored. The system may prompt the user when various assets are available for presentation. The presentation and associated content may be stored locally until certain memory thresholds or timing thresholds are met, or until some other action removes the content from local memory. The thumbnail content representations, or some other form of content, are persistent in memory but may be removed or new thumbnails added, through background operations that may run at various possible intervals.

In order to navigate to customer and potential customers, and to gather and learn various metrics associated with such customers, the mobile sales application also includes a prospect module. The prospect module may be configured to allow for a sales associate to research available data for potential customers and provides the user a graphical map showing the potential customers as well as a map of technical infrastructure relative to such customers. In the case of telecommunications, for example, the prospect module may graphically represent actual and potential customers in proximity to the network infrastructure necessary to provide various telecommunications services and products, and may further provide information relative to buildings in which such customers are located and may provide some of that infrastructure or be fitted with such infrastructure. The prospect map may include an interactive icon based map that allows the user to focus on specific areas at various levels of magnification and detail of the customers and infrastructure. Users may also have the option of filtering prospective customers or infrastructure based on a number of criteria. In other words, the prospect module is a powerful tool that associates customer opportunities with the geographically dispersed technical infrastructure, and can be used to target such opportunities effectively, and to manage such targeting in relation to other targets and opportunities among other advantages In one example, the technical infrastructure involves high speed data networks, including optical fiber and networking equipment such as gateways, routers, other equipment that facilitates data and voice connections to the network. In other cases, the technical infrastructure may involve that technology related to cable networks, cellular networks, water distribution systems, natural gas pipelines and distribution systems, electric power distribution systems, or various other types of infrastructures. In many cases, the geographic data and technical infrastructure data may be large and for various reasons, the geographic data and technical infrastructure data may not be able to be fully loaded onto the computing device being used. In these cases, the prospect module may also be configured to manage what is stored in the device cache and the acquiring of data from a network. The prospect module may be configured to store data on the system cache according to a user command. For example, a user may know that they are going to a location that has limited or no network connections available, or the user may have no idea if a network connection will be available. Thus, it would be beneficial for the user to pre-load information that the user may later need. The prospect module may be configured to allow the user to pre-load this data into the system cache for retrieval at a later time. To pre-load the data, computing device is connected to a network, and upon a command from the user, the prospect module may then retrieve the data from various sources on the network. In various embodiments, this may be done using a refresh function located on the map. While a user has loaded a view that they wish to save to the cache, the user may select the refresh option and the prospect module may reload the map and store all the information shown by the map, in the cache.

Additionally, the prospect module loads and provides target customer data with regards to the associated technical infrastructure allowing the sales associate to quickly and efficiently identify customer targets relative to the technical infrastructure. When a sales associate has identified a target geographic area, the prospect module may overlay the geographic and infrastructure display with customer intelligence data, such as go to market intelligence (GTMi) data, accessible from a remote database. The customer intelligence data may include financial data associated with the current accounts and services with the customer, as well as financial or other data that can be used to project internal rate of return (IRR) should various products or services be sold to the customer. Further, the system may be configured to display target customers by IRR and may take into account the proximity of the prospect to the target infrastructure as well as other factors impacting the ability to provide services to the prospect using the technical infrastructure, and may include graphical cues concerning the same. The data may also include graphical cues relevant to other information associated with the prospects, including ranked IRR projections (e.g., high, medium, low), customer contact information (e.g., available or not available), and proximity to technical infrastructure (e.g. on net (no significant additional infrastructure necessary to connect prospect with network) or off-net (requiring some amount of infrastructure investment to connect the customer and provide services). The prospect module allows the user to zoom to various levels of detail, allows the user to filter the various display parameters (e.g., top 100 prospects, top 10 prospects, prospects with contact information, etc.).

The graphical geographic and infrastructure representations are also access points to additional rich content. For example, customer prospect cues, when selected, such as by touching the customer's graphical icon in the case of a tablet based implementation, displays information about the prospect, including street address, specific IRR projections, contact information, and other information about the customer or potential customer. In the case of an on-net building, for example, the prospect module may also display building information including tenant information, aggregate IRR projections, tenant specific IRR projections, existing customers (for which additional services might be sold), and other information. Thus, for example, a user may not only obtain information about a specific target customer but may also learn information about other possible customers in the same area. In the specific case of a building, if an investment has been made or would be made to connect one customer to a network, such investment can be leveraged in the same area to connect other customers. The tool enables the user to easily and efficiently to identify such opportunities and capitalize on the same.

Figure 8:
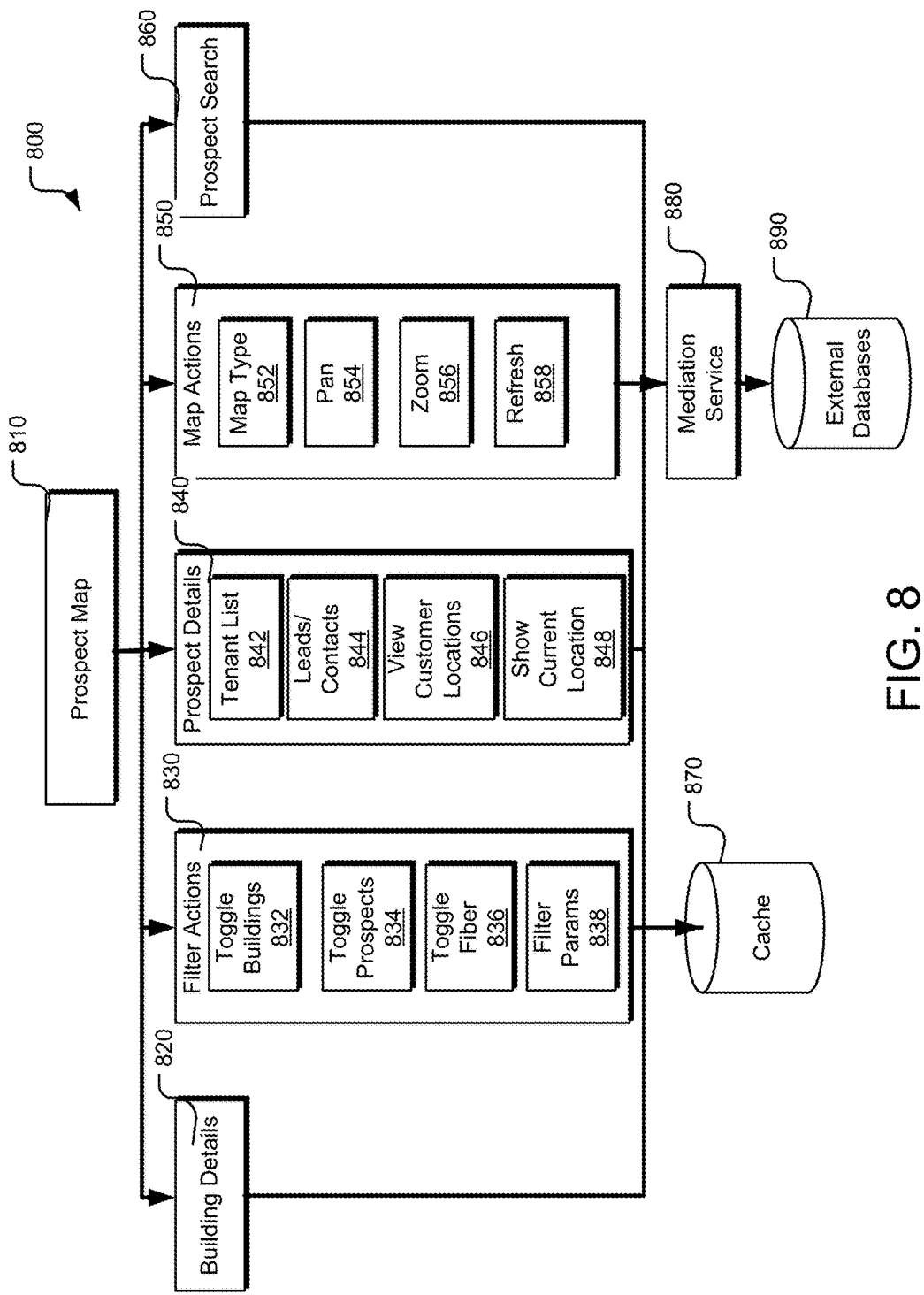
FIG. 8 is an illustration of the architecture and functions of a prospect module operating in accordance with the present disclosure.
Figure 10:
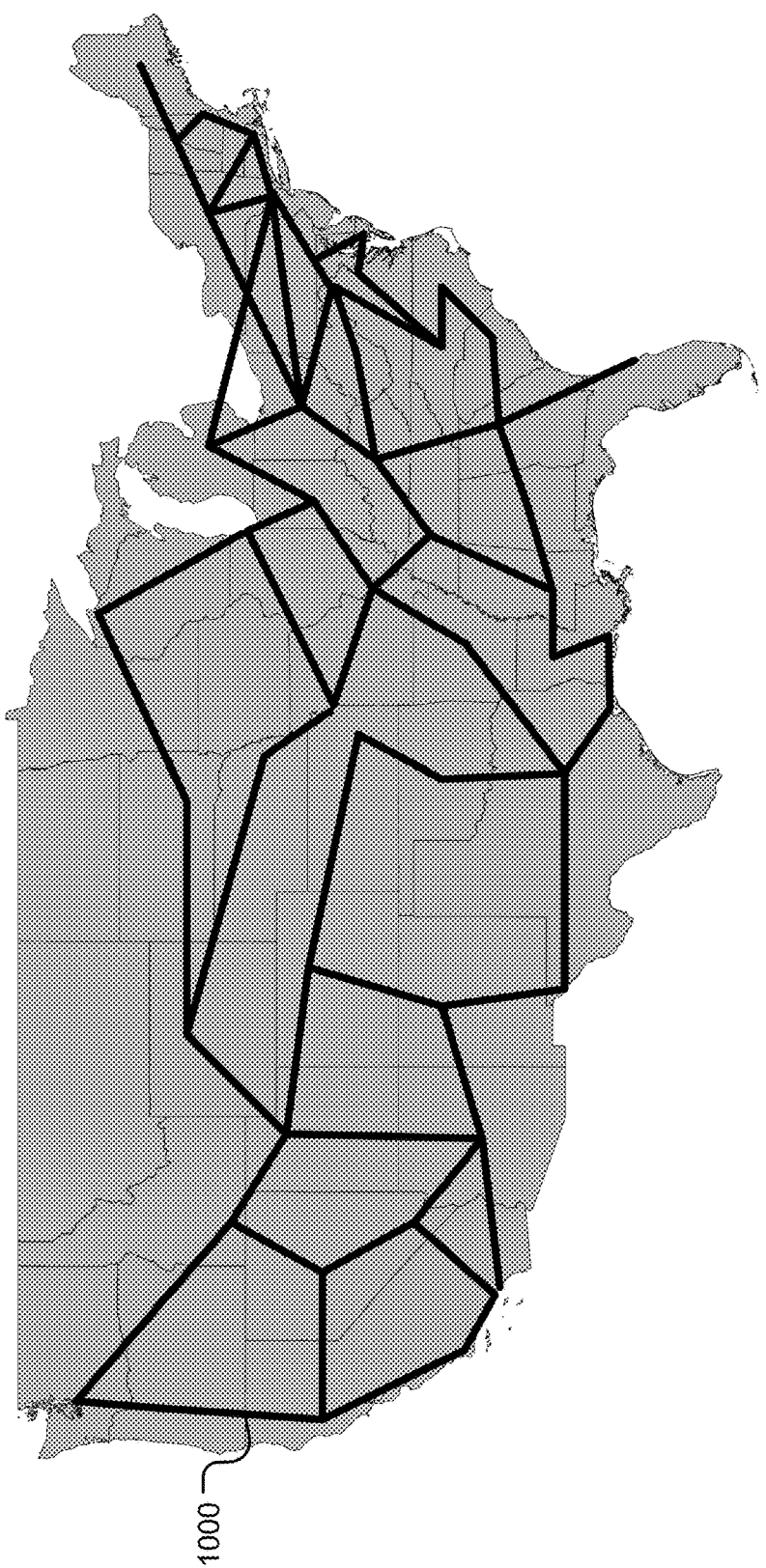
FIG. 10 is an illustration of the graphical user interface depicting a network map provided by the prospect module during operation.

FIG. 8 is an application architecture diagram for the prospect module 800. Referring to FIG. 8, in one example, the prospect module 800 presents the prospect map 810 to the user. The map may allow for various levels of detail and zoom. For example, the prospect map and may initially present a relatively low-resolution view of some geographical representation of the technical infrastructure associated with customers. For example, in the case of telecommunications infrastructure, the map may initially display the geographic area where the telecommunications company has infrastructure, or may display the geographic area that is associated with the sales territory of the user, among others. Some of this initial information may be locally cached. As the user pans across the map and zooms in or out to a specific area of interest, the system may load network route data and/or mapping data from a remote database. Referring to FIG. 10, in one specific example, the prospect module initially displays the full geographic scope and high-level layout of a long haul fiber network that spans the United States.

The prospect map 810 may be modified in a number of ways to show varying levels of graphical detail as well as include varying levels of prospects and prospect information. For example, the prospect map 810 may be modified using various map actions 850. These map actions may include altering the map type 852, switching from a satellite view to a map view or a hybrid view, panning 854 across the map, adjusting the level of zoom 856, and a refresh 858 to force the prospect module 800 to download information used to generate the map. The prospect map 810 may also include a prospect search 860. The prospect search allows for a user to search for a specific address and to have the map pan and zoom to that address. A user may, for example, enter a prospect name or address into a search box. The prospect module 800 may then conduct a search of the cache 870 for the prospect name or address. If the prospect name/address is found in the system cache, the prospect module 800 may then search the cache 870 for geographic and infrastructure data needed to populate a map with the location of the prospect. If the prospect or the geographic and infrastructure data is not present in the cache 870, the prospect module may search for the information in an external database 880. A mediation service 880 may be utilized to facilitate the search of the external databases 890. The mediation service 880 may be configured to receive a request for one piece of information and translate the request to a required action in the appropriate external database 890. For example, when conducting a prospect search 860, a database of prospects, a geographic database, and an infrastructure database may need to be searched. The prospect search 860 may request the information and the mediation service 880 may perform the actual searches in the external databases 890 and return the necessary data.

As the user navigates the prospect map 810, various prospects will be displayed. In some cases, the user may filter the prospects that are shown. The filter function 830 allows the user to tailor the display of types of prospects and map features. For example, the user may use the filter function 830 to toggle, or turn on or off, the displaying of buildings 832, fiber 836, and toggle prospects 834. Thus, when prospects or map features are filtered, the prospects and features displayed on the map are restricted accordingly. The user may also use the filter function 830 to focus the types of prospects shown by using various filter parameters 838. For example, the filter may include filter parameters that affect the display of prospects based on potential value thereby only displaying prospects that meet the value criteria of the filter. The filter function 830 may also include a parameter associated with the connection status of a prospect and displays prospects based on whether or not the prospect is connected to the technical infrastructure, is not connected, in a facility with an existing connection. For example, the filter function 830 may filter the prospects to only show those that are "on-net," directly connected to the infrastructure, or by only showing prospects that are "safe-net," not directly connected to the infrastructure, but are connected to a third-party that is connected to the infrastructure. For example, in the case of networking infrastructure, it is common for an area to only be serviced by one or more local providers. The local providers may not have infrastructure throughout the state/region, country, or world. Thus, to provide access to the Internet, the local provider connects to a network operated by another company that provides complete Internet access. In this case, the prospects receiving services from the local providers are "safe-net" prospects.

The prospect module 800 may also allow for the user to select prospect details 840 and building details 820 to gain additional information about particular prospects and the buildings in which they reside. The prospect details may include a tenant list 842 include a listing of all of the entities that are tenants of the prospect, a list of sales leads and contacts 844 associated with the prospect, details related to the architecture or infrastructure 846 located at the prospect, and the location 848 of the prospect. This information may be stored locally in the cache 870 and/or may be stored in an external database 890. When the prospect details are selected, some or all of the tenant list 842, sales leads and contacts 842, customer architecture and infrastructure 846, and location may be displayed. In order to display this information, the cache 870 may be queried and any information not found in the cache 870 may be retrieved from the external databases 890 using the mediation service 880.

In each case, the initial infrastructure and/or geographic data is either locally stored in a system cache 870 or located in an external database 890. When the user initially views the prospect map 810, the user may be taken to a default view or to a last view is still stored in the cache 870. As a user zooms to or pans to a specific area, the prospect module 800 initially displays the zoomed area using cached infrastructure and geographic data. In the background and concurrently, the prospect module 800 accesses the remote database 890 using various mediation services 880 configured to communicate with the remote databases 890 that store map related information, and loads higher resolution data for the zoomed area. When sufficient data is cached, the present module 800 updates the display with the higher resolution geographic and/or technical infrastructure data. A regional, national, or global sales force may use the mobile sales application, and thus the application may be capable of providing information for a variety of geographic areas.

The prospect module 800 may also interact with other systems, websites, and modules. For example, a user may identify a particular tenant as a "lead," or a tenant that is likely to make a purchase, and update that information to another site, module or application, such as Salesforce.com, and then launch the application(s) associated at the third party site. In the case of a web based service, the tablet or other device running the prospect module may automatically establish a network connection, launch a browser and connect with the service. In one example, some or all available prospect data may automatically be loaded from the prospect module 800 to the site. The prospect module 800 further allows the user to email prospect details to other sales team members, bookmark prospects, interact with other modules and applications and exchange data therewith, and may link information from the prospect module 800 to other modules.

Figure 9:
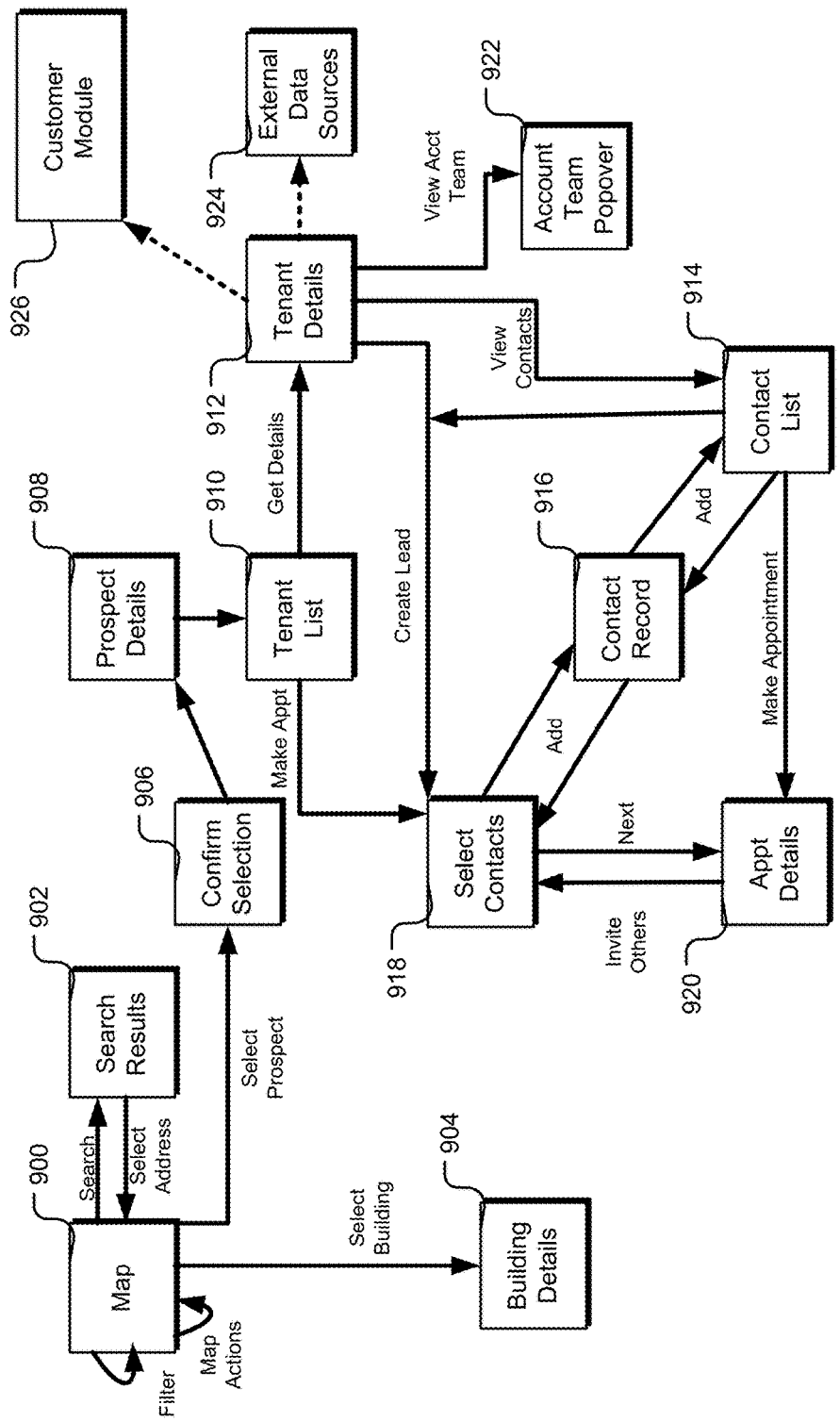
FIG. 9 is an illustration of the operation of the prospect module operating in accordance with the present disclosure.

Referring now to FIG. 9, a system flow for one possible example and use of the prospect module is depicted. In this embodiment, upon activation the prospect module loads and displays the prospect map 900. While viewing the prospect map 900, the user may manipulate the scope of the map with the various map actions as well as the content of the map using the filtering features.

Figure 11:
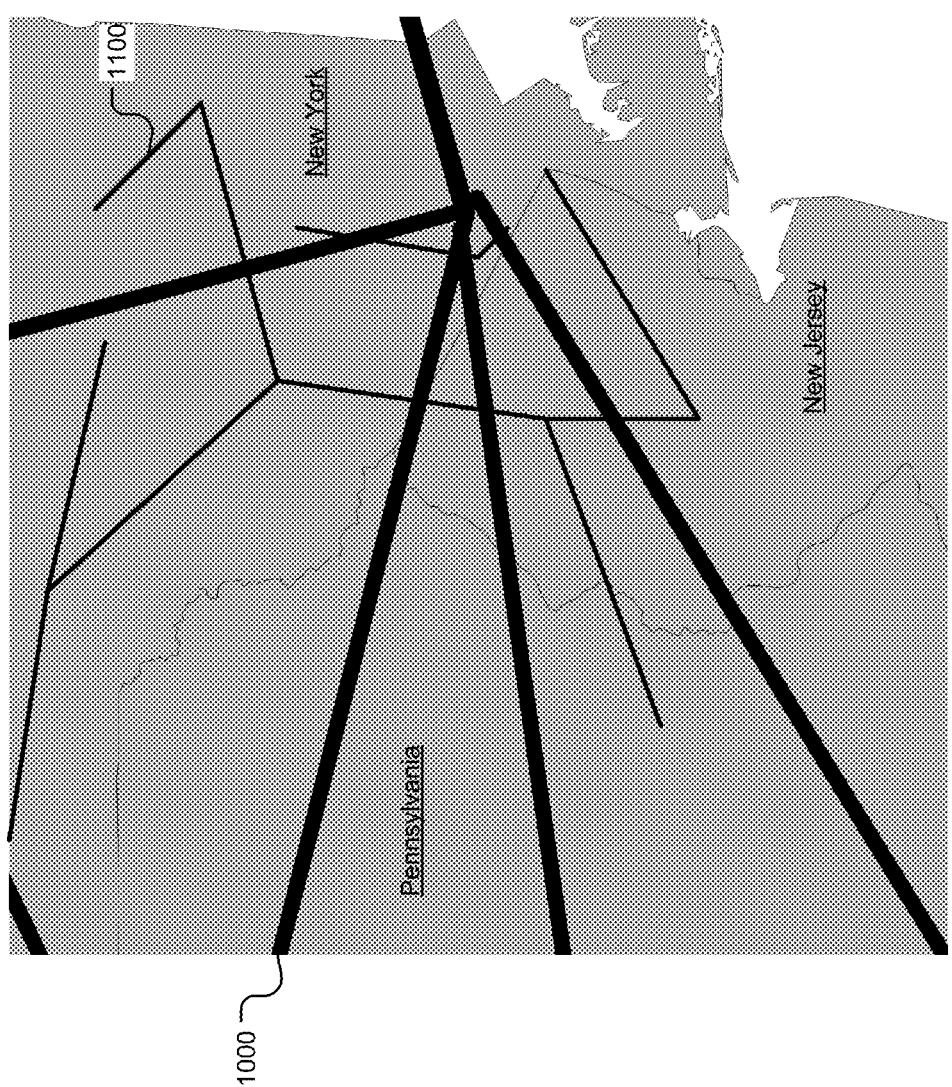
FIG. 11 is an illustration of the graphical user interface depicting zoomed-in network map provided by the prospect module during operation.
Figure 12:
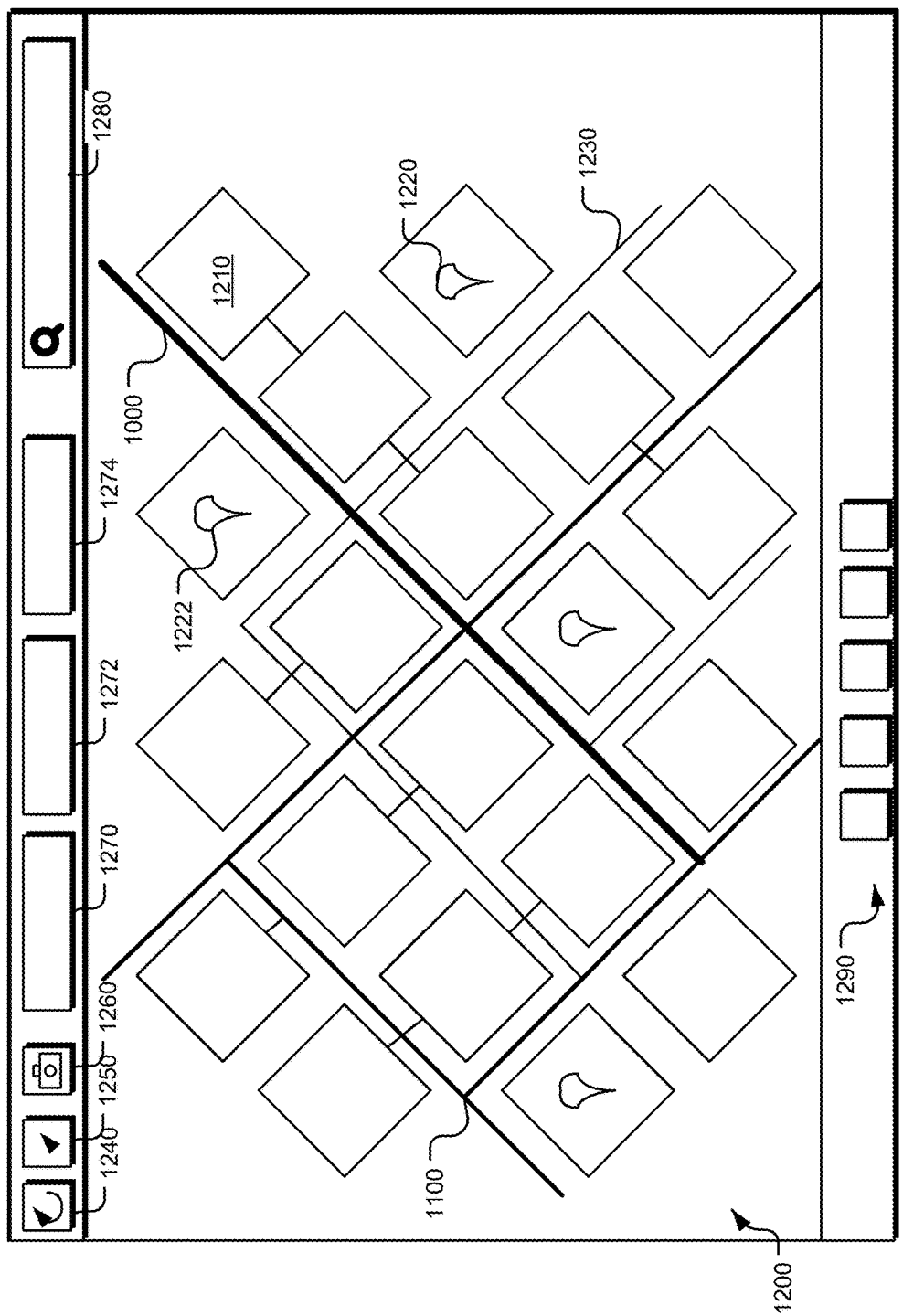
FIG. 12 is an illustration of the graphical user interface depicting a street-level network map provided by the prospect module during operation.
Figure 13A:
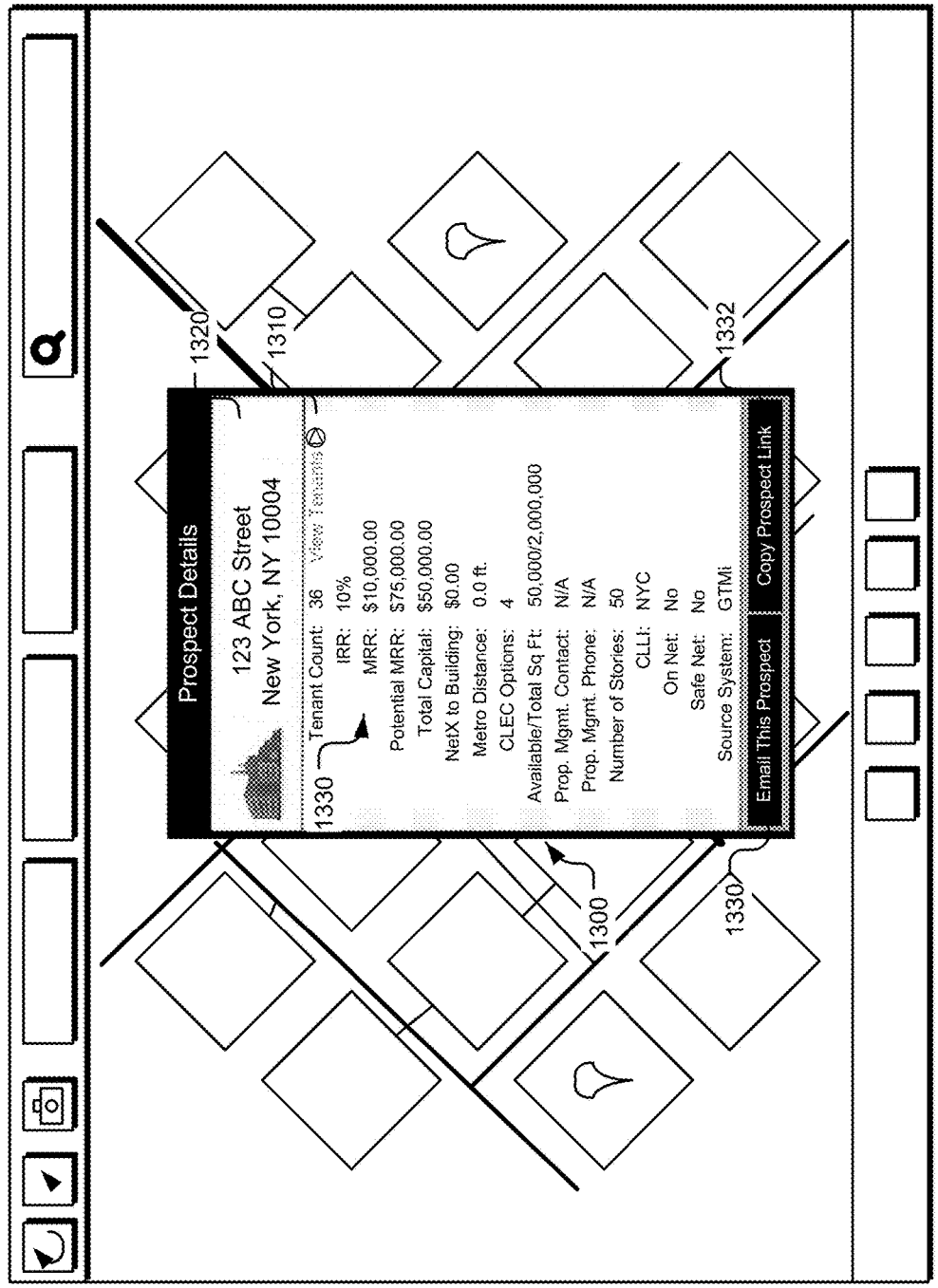
FIG. 13A-E are illustrations of the graphical user interface depicting the various popup menus used for using the various features of the prospect module overlaid upon the prospect map during operation.

A user can navigate to a specific map area in several ways including, panning, zooming and searching. For example, referring to FIGS. 10-12, if the user is interested in making a sales call to specific geographic area, then the user can zoom to that area. FIG. 10 depicts a view of the United States. Referring to FIG. 11, the user may pan and zoom to a specific area, in this case the States of New York and New Jersey. Referring now to FIG. 12, the user may further pan and zoom until he reaches a specific area within New York. Alternatively, the user can enter a search criterion, such as a specific address or customer, and the map will be updated based on the search criteria. With respect to searching, the user may enter a criterion and results 902 may include a selectable listing of prospects and/or buildings. The user then has the option of conducting a new search, selecting a building to view building details 904, selecting a specific prospect or returning to the map Selecting a prospect on the map may highlight the prospect's address and provide the user with an icon for displaying prospect or building details. For example, selecting the more information icon may cause a popup with detailed financial revenue projection information for the prospect. For example, referring to FIG. 13A and with continued reference to FIG. 9, an example popup window depicting prospect details 1300 is depicted. The prospect details 908, 1300 may have a view tenants option 1310 for viewing a tenant list 910 that includes all of the known tenants at the location. Selecting the view tenant details option 1310 may cause the window to display specific tenant details 912 such as the tenant name and other relevant information such as the number of employees the tenant has, the size of the tenant's space, the type of location (i.e. corporate headquarters), the monthly recurring revenue for the tenant, the specific type or grouping of industry of businesses such as a vertical market the tenant belongs to, and a contact phone number for the tenant. The tenant details also provide contact lists 914 associated with the tenants. Contact records 916 for each of the contacts. A user may select a contact 918 to create an appointment 920. The prospect details 912 may also include the prospect address 1320 and detailed information 1330 about the prospect including the number of tenants located at the prospect, the projected internal rate of return of the prospect, the current and marginal rate of return, the potential marginal rate of return, the total capital costs of extending the technical infrastructure to the prospect, the proximity to technical infrastructure, the square footage, the number of stories, whether the building is On-Net, Off-Net or Safe-Net, and any contact information for the prospect.

The prospect window 1300 may include options that invoke features of other modules. For example, when a prospect's details are displayed, the window 1300 may include a "copy prospect link" option 1332. The copy prospect link function 1332 may create a bookmark to the prospect in the bookmarks of the learn module. Selecting the prospect link in the learn module will cause the prospect module to be loaded and, if possible (i.e. either connected to a network, or the map is loaded in cache), show a map with the location of the prospect.

One aspect of the prospect module 900 is the creation of leads. A lead may be generated based on a tenant or a specific contact. If the user elects to generate a lead, the tenant's information is automatically transferred to an external database 924 for later retrieval. In one example, using the create lead function automatically creates a new lead on salesforce.com by transferring the various tenant. For example, the new lead may be created by opening an internet browser and navigating to a lead creating webpage on salesforce.com. In this example, the system may first require to the user to login by providing a username and password. This may be automatically populated by the prospect module 900 by retrieving previously stored login information from the cache or it may be manually entered by the user. Once the user has been logged in, a screen associated with generating a lead on Salesforce.com may be shown. The Tenant Customer name and address, and tenant financial prospect details are automatically populated into to SFDC new lead fields. After the new lead has been created the user is returned to the map view with the prospect window shown. The user may also elect to share the prospect with other sales team members or employees of his company. The prospect details windows includes a link to email the prospect to an email address. A link to the prospect may also be bookmarked for future retrieval. The tenant details may include information on the account team 922 that is working with the tenant.

Referring again to FIGS. 10-12, various views of a prospect map and related information are depicted. Beginning in FIG. 10, the prospect map shows a map of the United States and long-haul telecommunications infrastructure 1000 that spans the United States. The long-haul infrastructure includes primary backbone connections that connect systems in various cities and states. The information used to generate the prospect map of FIG. 10 may be locally cached. Depending on the level of zooming or the area zoomed, the system may have to fetch higher resolution information. The network map is updated with the higher resolution information for a given zoom level once the information has been downloaded from the network and cached. This information may be available for later use. So, for example, if a user accesses the prospect map within some period of time after earlier using the map and zooming to an area, the higher resolution data for the zoomed area may be available in cache.

As the user zooms in further, the prospect module fetches and displays more detailed network information for metro and lateral routes. So, for example, while FIG. 10 illustrates network infrastructure at very general and high level, upon zooming to a specific geographic area, additional more granular telecommunication network details may be displayed. FIG. 11 depicts a map that has been panned and zoomed in on portions of New York, New Jersey, and Pennsylvania. In this more granular area of the prospect map, metro infrastructure connections 1100 linking different localities are shown. In the case of a telecommunications provider, long-haul routes generally refer to network connections spanning the largest distances, connecting major networking hubs. For example, this would include a connection that connects Chicago to New York City to London. Metro routes generally branch out from the major networking hubs and span medium distances such as between New York City and Albany. Lateral routes are shorter routes that branch out to users to connect them to the long-haul and metro routes. For example, a building may be connected to a lateral route, which connects to a metro route, which connects to a long-haul route. FIG. 12 depicts a detailed view of the prospect module GUI 1200 that is zoomed in on several blocks in a city. In this example, various buildings 1210 are depicted, as well as long-haul infrastructure 1000, metro infrastructure 1100, and lateral infrastructure 1230. In the zoomed view of FIG. 12, various prospects 1220, 1222 are identified with a unique visual queue. The queue may be color-coded in some examples based on various possible attributes of the customer (or prospect). The GUI 1200 also includes conventional features such as a refresh option 1240, a location finder 1250, a screenshot option 1260, and buttons for switching the map type 1270-1274.

Besides performing conventional refreshing functions as with a browser refresh, the refresh option 1240 may also be used to force the system to obtain and cache high-resolution network data in a particular area. This may be done when the user is connected to the network and anticipates not being connected to the network at a later time. So, for example, prior to traveling to an area for to meet with current or potential customers, the user may navigate to the specific area on the application, which either through zooming and/or use of the refresh option, will cache the data for the level of detail depicted. Thus, the application will have the information cached so that the user will have access to the appropriate data regardless of the availability of a network connection in the area. In this embodiment, the search box 1280 is also included to facilitate address searches. The GUI 1200 may also include links 1290 to the various other modules.

The GUI 1200 may launch various popup windows according to the selections made by the user. For example, referring to FIGS. 13A-E, various popup windows for facilitating the features of the prospect module. For example, FIG. 13E includes a network layers tool 1370. In this example, the system includes some default graphical representation of the technical infrastructure but also allows the user to select additional related infrastructure, such as lateral and metro networks besides the long haul network. The network layer tool allows the user to select which infrastructure is shown as data becomes available at appropriate zoom levels. For example, the user may select whether the long-haul, metro, or lateral infrastructure will be shown at the appropriate zoom levels, as shown in FIGS. 10-12. In the illustrated example, the selection of which infrastructure to display on the map may include one or more switches 1372-1376.

Figure 13B:
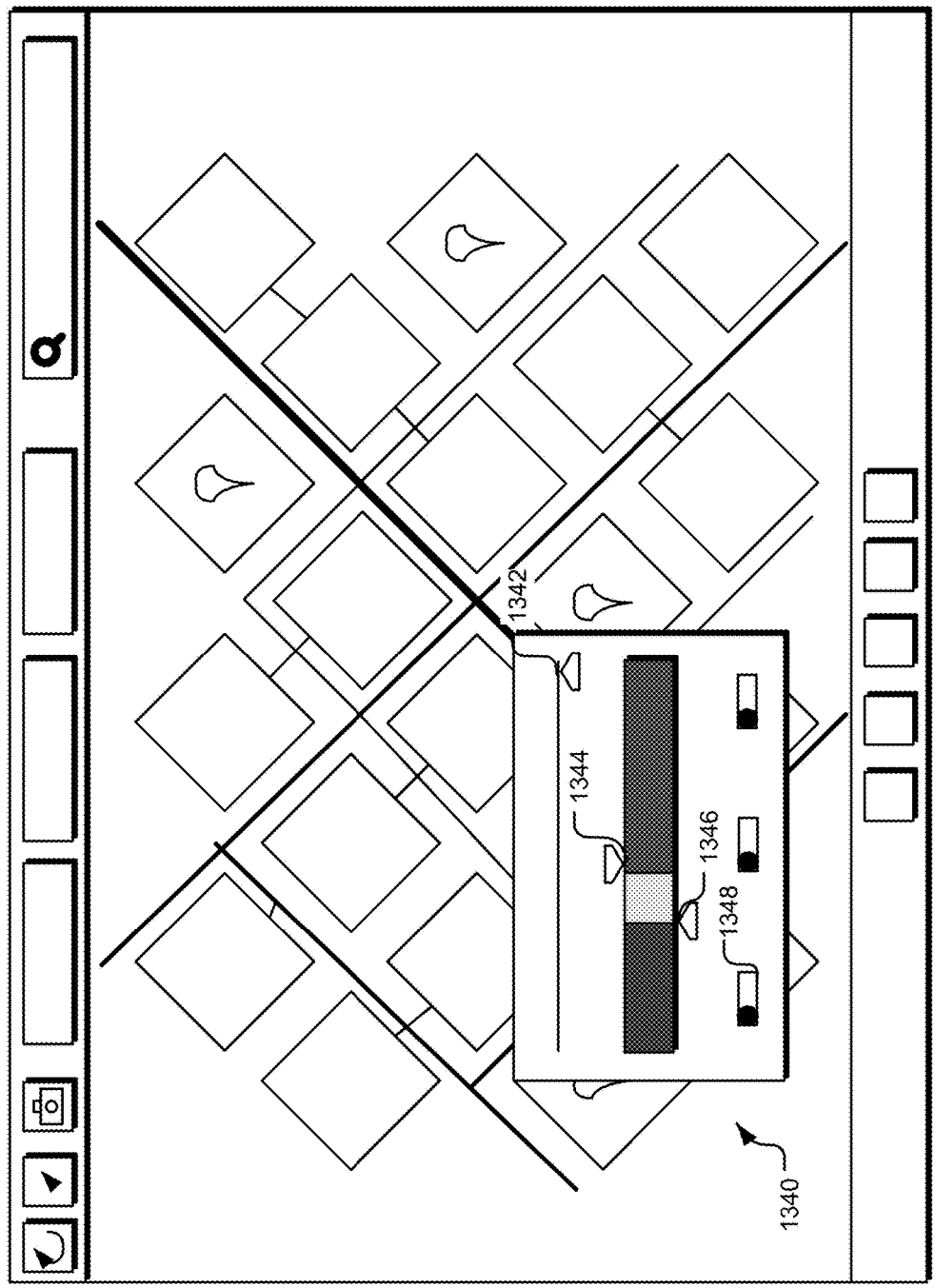
Figure 13C:
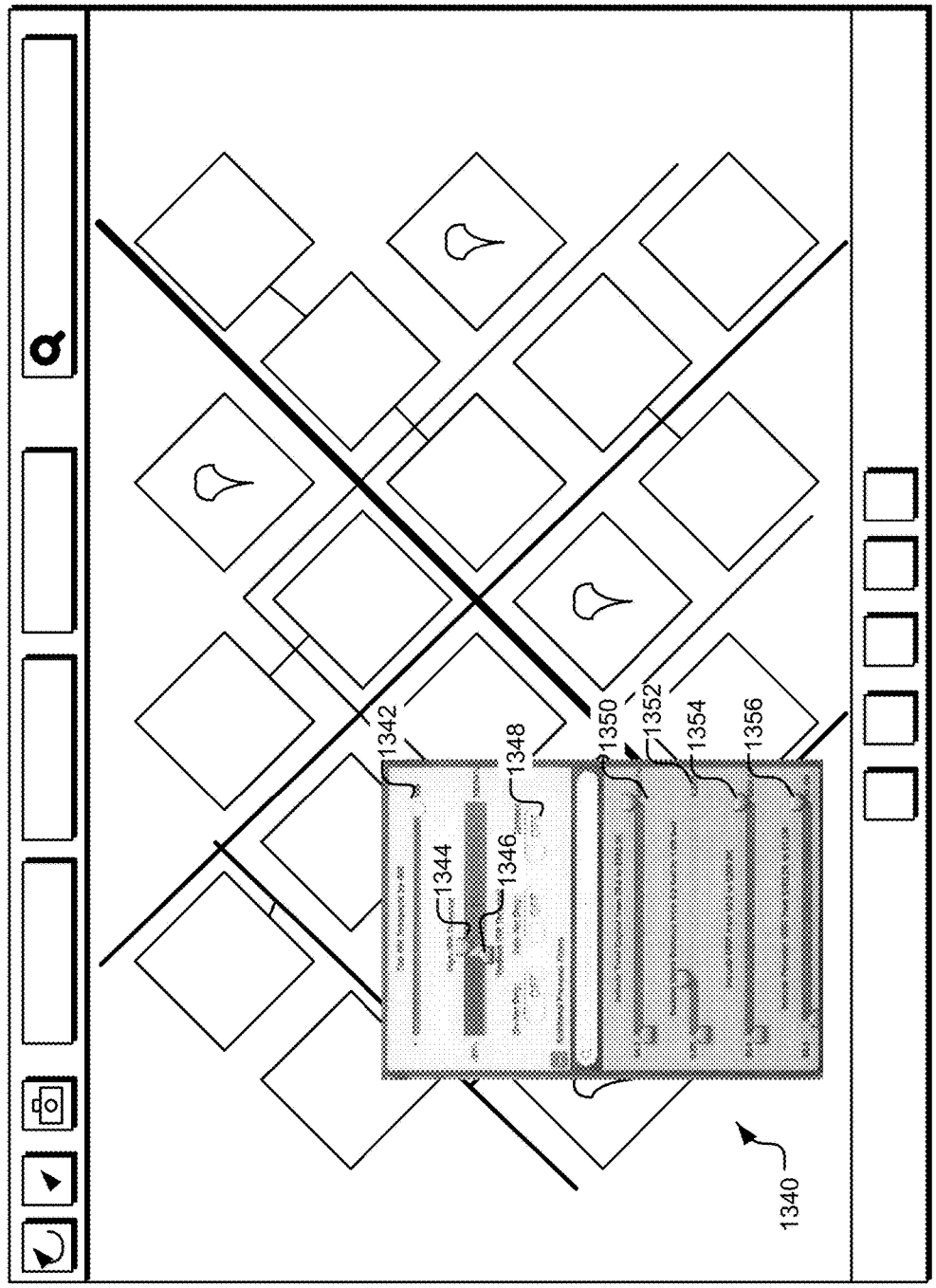
Figure 13D:
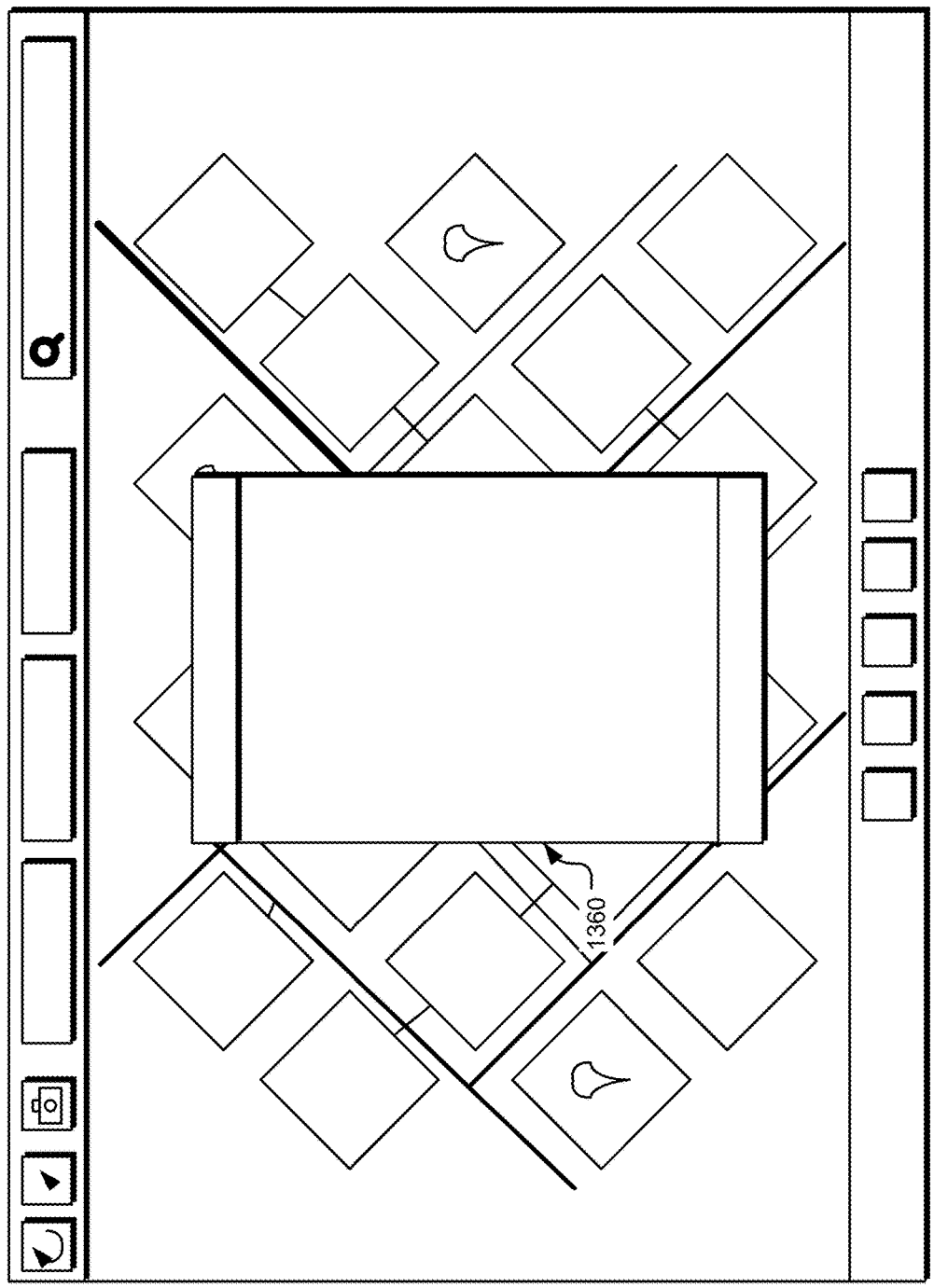
Figure 13E:
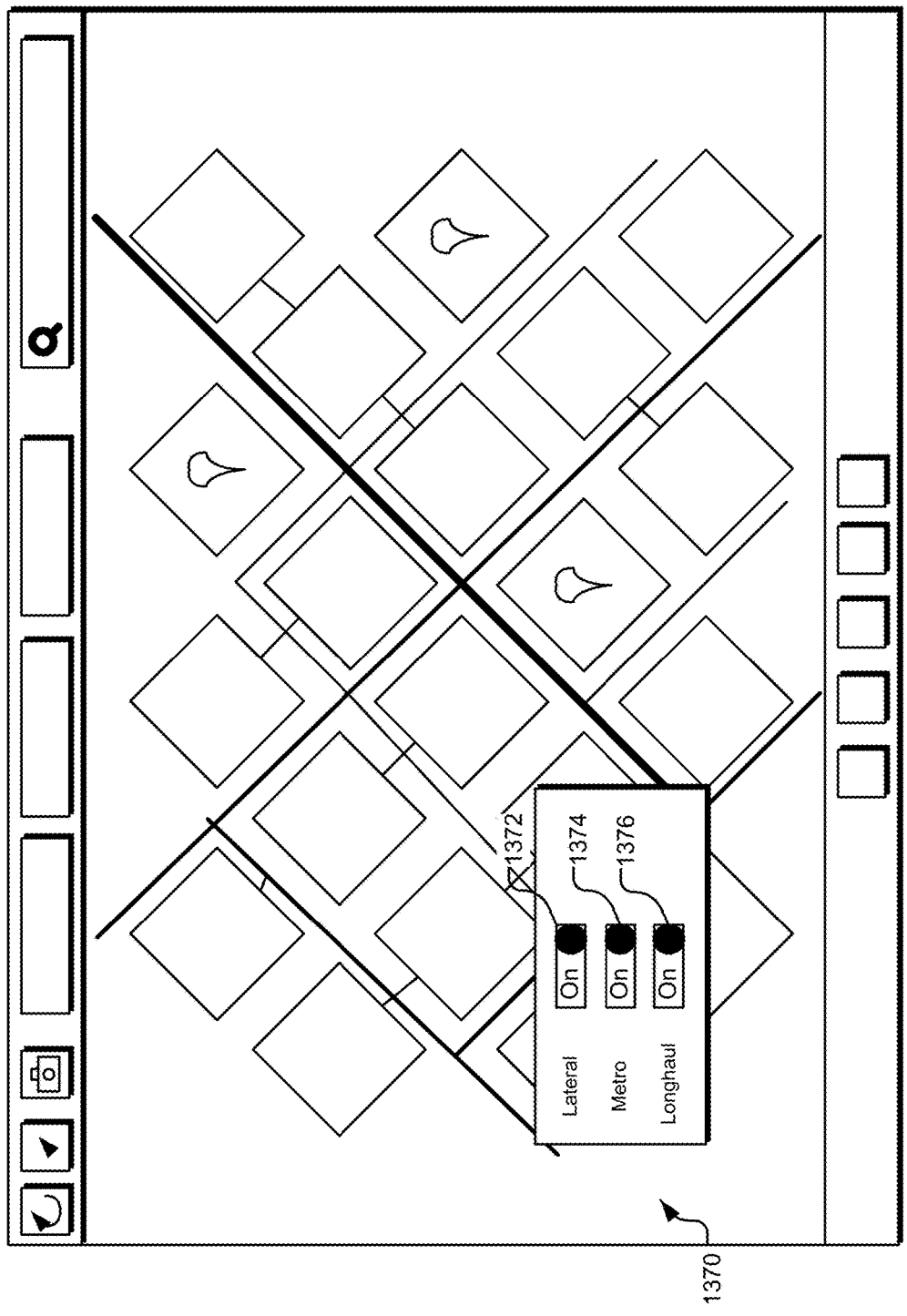

FIG. 13B includes a filter tool 1340 that allows the user to adjust the prospect filter. As described above, the prospect filter tool 1340 may allow the user to adjust the prospects that are shown in the prospect map. For example, a user may select to filter the prospects shown on the map prompting the filter tool 1340 to be displayed in the prospect map. For example, the filter may include a threshold for the total number of prospects and a threshold for the level of prospects. In this example, the thresholds are depicted as slider bars 1344, 1346 in a window, but it should be understood that a variety of methods could be used. The filters may also have options to show prospects based on the infrastructure that the prospect is connected to (i.e. On-Net, Off-Net, and Safe-Net prospects) or show property contacts. In one example, a top prospect filter 1342 may be included to allow the user to focus on fewer highest value prospects on the map display. In the depicted example, slider bars 1344, 1346 allow the user to quickly adjust the number of prospects shown based on a first IRR threshold 1344 and a second IRR threshold 1346. These thresholds 1344 may be selected such that the total number of prospects within an IRR range may be shown on the map. The prospect filter tool 1340 may also include switches 1348 for toggling whether prospects are displayed based on the infrastructure they are connected to and whether to show property contact information. FIG. 13C depicts some additional filters that may be included in the filter tool 1340. In this example, the prospect filter 1340 also includes filters for selecting a range in the total capital costs of extending the technical infrastructure to the prospect 1350, a range for the distance from the closest metro infrastructure 1352, a monthly recurring revenue range 1354, and a potential rate of return range 1356. Furthermore, the prospect module may be configured to filter the prospects according to any criteria and the provided examples are not meant to be exhaustive.

FIG. 13C depicts a general popup window 1360 that may be used to display and select various lists and details to facilitate the various features described above. For example, when a prospect is selected, a popup window may be launched over the prospect map that shows the prospect details. The popup window 1360 may be used to show building details such as the tenant lists and tenant details described above, but may also include a list of names of people associated with the building or are designated building contacts. Each name may be linked to a contact record that may then populate the window 1360 with any relevant information for the contact, including the contact's name, addresses, phone numbers, email address, and job title. The contact record may also include any details regarding scheduled meetings with the contact, the time of the meetings, and the location. Thus, a user may start with a generalized map of an area, filter out the prospects to find prospects of interest, select an individual prospect, then be able to review any known contacts associated with the prospect. Once the user has selected a prospect, the user then has the ability to then use the presentation module to quickly create a presentation and tailor the presentation for the customer.

After giving a presentation, the sales associate may then use the quote module to generate a quote for the various products and solutions that were presented to the customer. The quote module allows a user to quickly generate sales quotes for customers by both allowing the user to browse and search previous quotes as well as quickly create new quotes. Utilizing the background information compiled by the various modules, and particularly the quote module, such as IRR targets, customer information, and product and service offering details resident locally and through network accessible storage and databases, the quote module may generate a firm quote and provide the quote to a prospect for acceptance. Thus, for example, during a meeting with a target customer, the user may use the presentation module to create a presentation detailing the various products and solutions available then generate a quote based on the customer feedback to that presentation that the customer might accept thereby closing the deal on the spot so to speak. This in contrast to a conventional sales cycle that typically involves less efficient follow-up after a meeting. While there is certainly opportunity in the present system for follow-up after an initial quote, the system provides the distinct advantage for both parties to generate and accept a quote at the very precise time when both parties are discussing the product or services, and their attention is focused on such product or service.

Figure 14:
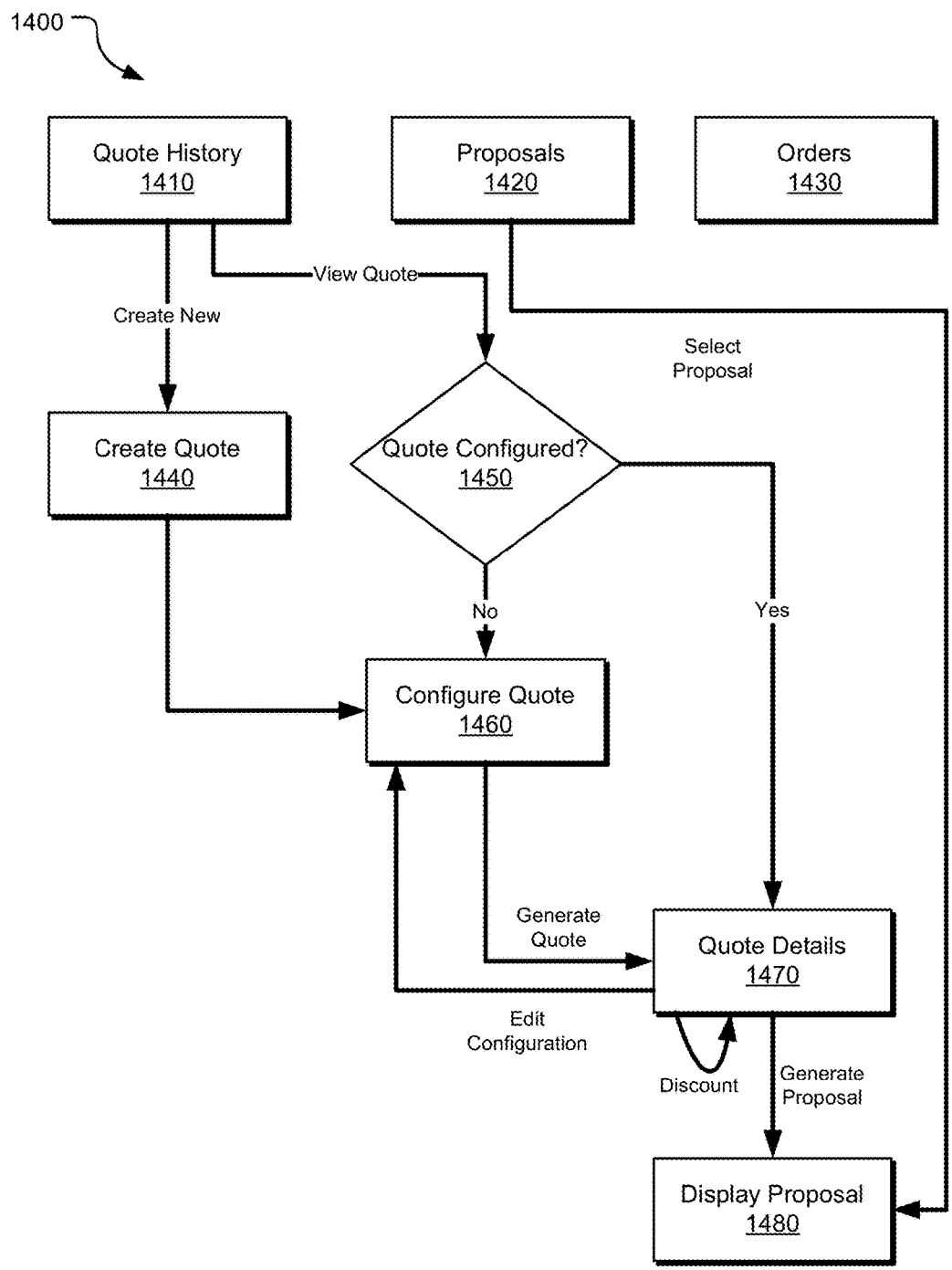
FIG. 14 is an illustration of the operation of the quote module operating in accordance with the present disclosure.

Referring to FIG. 14, a flow diagram depicting the quote module 1400 in use is depicted. When a user loads the quote module 1400, the user is able to select whether to view a listing of previously created quotes 1410, previously created proposals 1420, and previous orders 1430. If the user wishes to create a new quote, the user may start with a previously created quote history 1410 and modify that quote, or the user may elect to create a new quote 1440. The quote history 1410 may include a scrollable list of previously created quotes that includes, for example, a name of each quote, a name of the customer the quote was made for, when the quote was created or last updates, and whether the quote was completed. Each quote includes a listing of the products and services being quoted, any time durations such as equipment leases or term lengths, recurring costs, non-recurring costs, and any usage based fees (i.e. cost per unit of use). New quotes and unconfigured previous quotes require user configuration 1450 to provide the details of what the quote will be for.

Figure 15:
FIG. 15 is an illustration of an implementation of the configuration of a quote in operation using the quote module.

Referring to FIG. 15, a quote configuration screen 1500 is depicted. In this example, the quote configuration includes customer information, including customer name 1520, quote name 1510, creation date 1530, a customer address 1550, and a listing the products, services, and/or solutions being quoted to the customer 1560. Once this information has been provided, a quote can be automatically generated by accessing a listing of the various costs associated with the selected products, services, and/or solutions. The listing may, for example, be a list in a file or a database of the cost of each product, service, and solution, and may also include sales information associated with each entry. For example, the sales information may include the margins and markups associated with each product, service, and solution. The sales information may be stored locally on the cache or remotely in a database or server. Using this sales information and the products, services, and solutions outlined in the quote configuration, the quote module may automatically create a quote that summarizes the quote and lists each selected product, service, and/or solution, a cost associated with each, any discounts being applied, and a total cost. Once the quote has been generated, the user may elect to view the details 1470 for the quote. The quote details may for example include prices for monthly recurring charges, non-recurring charges, usage fees, and any discounts being applied.

The quote module 1400 may also be configured to allow for the user to provide a discount in the quote. The quote module may also be configured to place limits on the amount of any discount. For example, the quote module may include rules to govern what can be discounted, how much a product or service can be discounted, and any limits on discounts. The quote module may also be configured to seek manager approval for allowing larger discounts. For example, if the sales associate seeks to give a larger discount than what is configured in the quote module, the quote module may send the proposed quote via email to a manager for approval, and upon approval alert the sales associate. In one example, the approval may allow the user to enter in an override password. If an approval is not immediately available, the quote module may show the user a maximum discount allowed and allow the user to use that discount.

The quote module may also include a customer mode for hiding information that is sensitive. For example, values such as list prices, gross margins, and discounting capability are important for the sales associate to have access too, but are not values that are good to show customers. When the sales associate wishes to show the customer quote details or the proposal, the sales associate may engage the customer mode and the quote module will hide sensitive values. If a quote is approved by a customer, the quote module 1400 may allow for a proposal to be automatically generated 1470 and displayed 1480. The proposal may be generated by automatically populating a proposal template with information in the quote. The proposal template may be located in the cache or remotely on a server. This proposal may also be emailed to the parties.

The mobile sales application may also include a customer module to help provide the sales associate with a picture of the current state of a relationship with a particular customer. For example, the customer module may provide information about past sales, past problems, and current issues that a customer may be facing.

Figure 16:
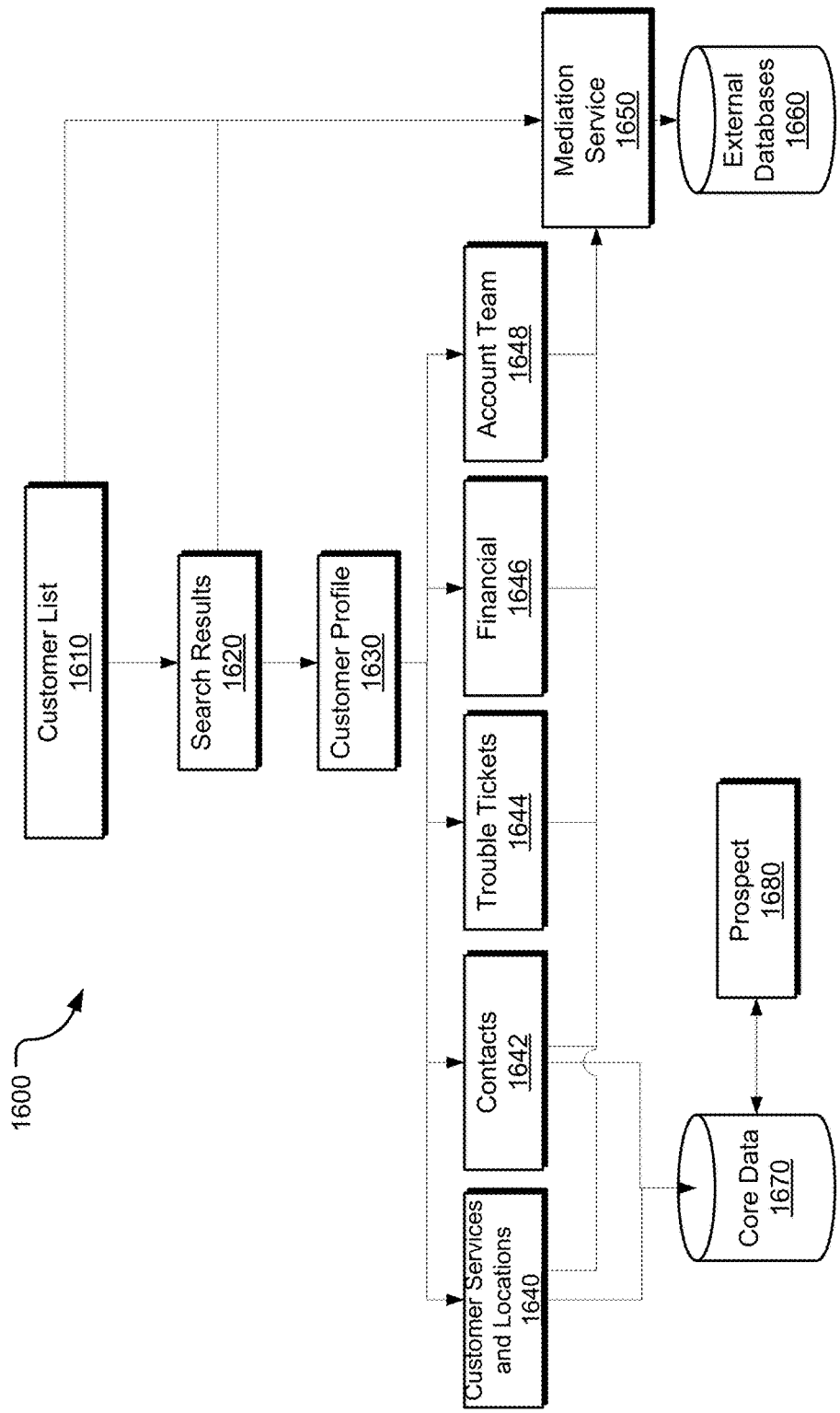
FIG. 16 is an illustration of the architecture and functions of a customer module operating in accordance with the present disclosure.

Referring to FIG. 16, example architecture of the customer module 1600 is depicted. In this example, the user may select a customer from a customer list 1610 which may be stored on the computing device or in an external database 1660. Customers may be selected directly from the list, or a customer search 1620 may be performed. Each customer has a customer profile 1630, that may include all information related to the customer, including the services being used at each customer location 1640, contact information 1642, trouble tickets 1644, financial information 1646, account team information 1648, as well as billed services, billing addresses, payment history, invoices, credit ratings, or any other relevant data. A portion of the customer information may be stored on the computing system in the system's core data 1670. This customer information may also be accessible by one or more of the other modules. For example, the prospect module 1680 may be able to access and use the core data 1670. In the case of the prospect module, the prospect module may access the customer location 1640 and contact data 1642 to populate the prospect map.

Figure 17:
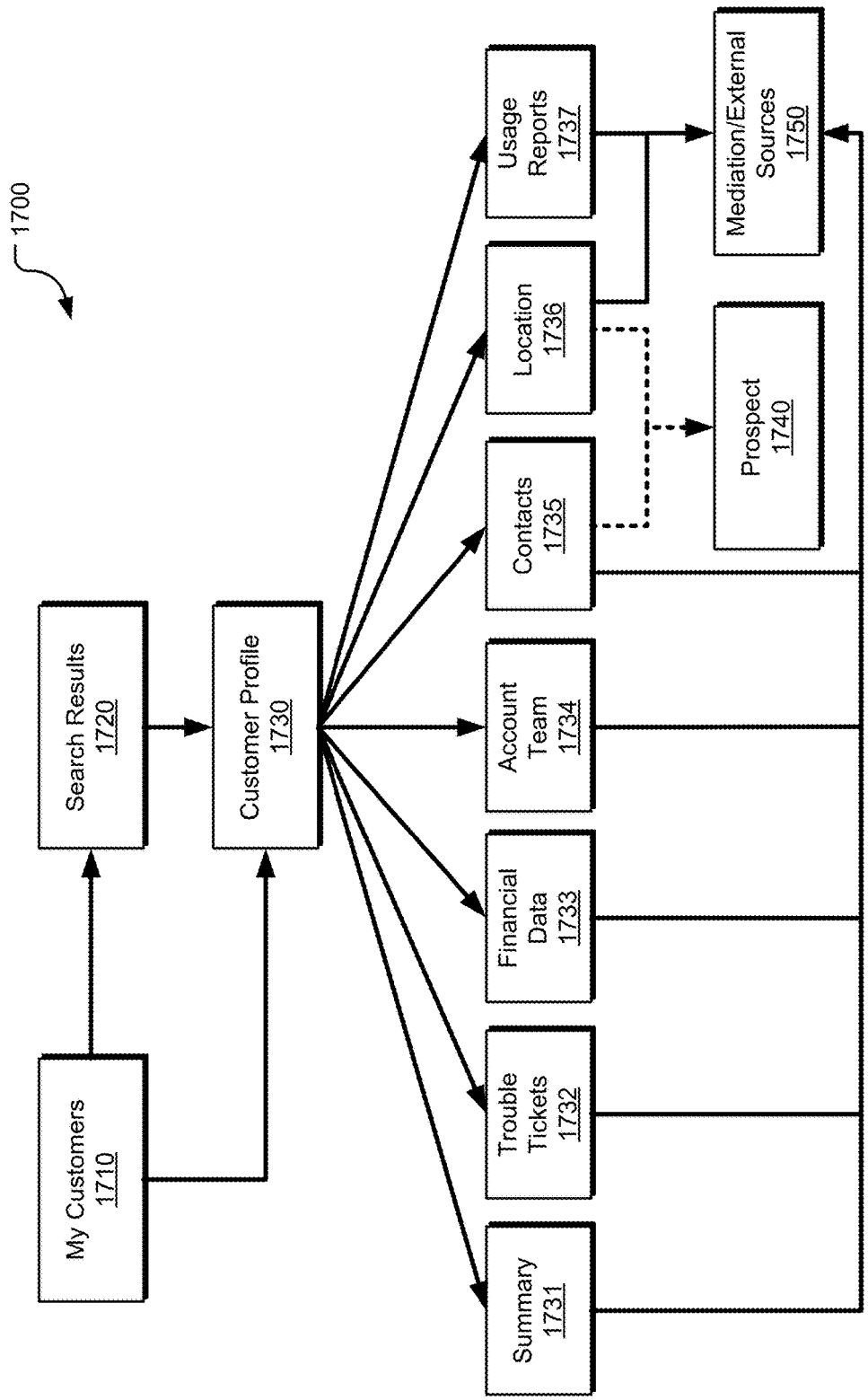
FIG. 17 is an illustration of the operation of the customer module operating in accordance with the present disclosure.

Referring to FIG. 17, an example application flow diagram for the customer module 1700 is depicted. The customer module allows a sales person or other user to manage sophisticated and numerous customer accounts. In this example, the customer module 1700 includes customer contact information 1735, account team membership and contact information 1734, customer financial information 1733, invoices and status of the same 1737, and service information and trouble tickets 1732. For example, the module provides detailed invoice data, payment history, customer credit limits and ratings, and visual cues concerning account information. The module also includes service information, such as service tickets, and the status of the same. Thus, for example, if a customer has an open ticket, the sales person can obtain information concerning the presence of the ticket and the status of the ticket prior to a meeting the customer. With such easily accessible information and functionality, the sales person has all the tools necessary to have a productive meeting with a customer.

The customer module also links to data associated with the prospect module to display and provide information concerning prospects geographically proximate an existing customer, or other existing customers proximate a certain customer. In this way, the sales person can use the tool to efficiently target other prospects or visit with other customers efficiently. An individual customer may be selected in the customer module and the prospect module may be loaded and the prospect map shown. The prospect map may be populated based on a customer's address or may map all of the customers in a list of customers.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A system for identifying and efficiently navigating to a customer in a geographic area comprising:
   a computing device including
   a display,
   at least one memory including a local memory located within the computing device, wherein the local memory pre-loads into a cache geographic data for displaying a selected geographic area, technical infrastructure data for displaying a technical infrastructure within the selected geographic area, and a listing of identifiers of specific customers located within the selected geographic area, and
   a processor coupled to the display and the at least one memory via a system bus, the at least one memory storing instructions for execution on the processor, the instructions configured to cause the processor to:
   load map data and customer data from a remote database;
   filter the loaded map data and the customer data using filter parameters;
   determine an absence of a connection between the computing device and a wireless network;
   in response to determining the absence, prevent the computing device from attempting to connect to any wireless network and generate a prospect map based on the loaded map data displaying:
   the selected geographic area, based on the cached geographic data;
   the technical infrastructure comprising network infrastructure required to support a telecommunication service within the selected geographic area, based on the cached technical infrastructure data;
   at least one identifier of at least one specific customer located within the selected geographic area, based on the cached listing of identifiers, wherein at least one specific customer requires access to the technical infrastructure in order to receive the service, and wherein the at least one specific customer is displayed in accordance with a first prospect criteria;
   generate a prospect detail window overlaid on the prospect map on the display;
   wherein the at least one identifier is selectable, the prospect detail window being displayed when a user selects the selectable identifier, and
   wherein the prospect detail window comprises a listing of at least one tenant located at a location of at least one identifier of at least one specific customer and one or more additional information about the at least one tenant.

2. The system of claim 1, wherein the at least one identifier comprises an identifier configured to display a color coded to indicate a projected value associated with the at least one specific customer obtaining the service.

3. The system of claim 1, wherein the first prospect criteria comprises an internal rate of return (IRR) projection based on the at least one specific customer obtaining the service, wherein the at least one identifier is displayed when the IRR projection meets an IRR threshold.

4. The system of claim 3, wherein the at least one identifier comprises an identifier configured to display a color coded identifier to indicate the IRR projection.

5. The system of claim 1, wherein the at least one identifier comprises an identifier configured to display a color coded identifier to indicate a cost to connect the customer to the technical infrastructure.

6. The system of claim 1, wherein the at least one identifier comprises an identifier configured to indicate there is a contact information for the at least one specific customer associated with the at least one specific building.

7. The system of claim 1, wherein the one or more additional information about the at least one tenant comprises at least one of:
   a current monthly recurring revenue (MRR) of the at least one specific customer;
   a potential MRR of the at least one specific customer;
   a distance from the technical infrastructure of the location of at least one identifier of at least one specific customer;
   an indication of whether the at least one specific customer is directly connected to the technical infrastructure; and
   an indication of whether the at least one specific customer is indirectly connected to the technical infrastructure.

8. The system of claim 7, wherein the at least one specific customer is displayed in accordance with a first prospect criteria and a second prospect criteria, wherein the first prospect criteria comprises a minimum MMR and the second prospect criteria comprises a maximum MMR.

9. The system of claim 7, wherein the at least one specific customer is displayed in accordance with a first prospect criteria and a second prospect criteria, wherein the first prospect criteria comprises a minimum potential MMR and the second prospect criteria comprises a maximum potential MMR.

10. The system of claim 7, wherein the at least one specific customer is displayed in accordance with a first prospect criteria and a second prospect criteria, wherein the first prospect criteria comprises a minimum distance from the technical infrastructure and the second prospect criteria comprises a maximum distance from the technical infrastructure.

11. The system of claim 7, wherein the at least one specific customer is displayed in accordance with a first prospect criteria and a second prospect criteria, wherein the first prospect criteria comprises a minimum capital cost value and the second prospect criteria comprises a maximum capital cost value.

12. The system of claim 7, wherein the first prospect criteria comprises a positive indication of whether a prospect is directly connected to the technical infrastructure.

13. The system of claim 7, wherein the first prospect criteria comprises a positive indication of whether a prospect is indirectly connected to the technical infrastructure.

14. The system of claim 1, further comprising:
an external memory connected to the computing device via a network connection, wherein the external memory stores a copy of the cached geographic data and other geographic data for displaying any selected geographic area, a copy of the cached technical infrastructure data and other technical infrastructure data for displaying the technical infrastructure within the any selected geographic area, and a complete listing of identifiers including the cached listing of identifiers and other identifiers for displaying at least one identifier of at least one specific customer located within the any selected geographic area.

15. The system of claim 1, wherein the instructions are further configured to cause the processor to generate a sales quote.

16. A method for identifying and efficiently navigating to a customer in a geographic are using a computing device, the method comprising:
caching in at least one memory including a local memory located within the computing device geographic data for displaying a selected geographic area, technical infrastructure data for displaying a technical infrastructure within the selected geographic area, and a listing of identifiers of specific customers located within the selected geographic area;
loading map data and customer data from a remote database;
filtering the loaded map data and the customer data using filter parameters;
determining an absence of a connection between the computing device and a wireless network:
in response to determining the absence, preventing the computing device from attempting to connect to any wireless network and generating a prospect map based on the loaded map data displaying:
the selected geographic area, based on the cached geographic data;
the technical infrastructure comprising network infrastructure required to support a telecommunication service within the selected geographic area, based on the cached technical infrastructure data;
at least one identifier of at least one specific customer located within the selected geographic area, based on the cached listing of identifiers, wherein the at least one specific customer requires access to the technical infrastructure in order to receive the telecommunication service, and wherein the at least one specific customer is displayed in accordance with a first prospect criteria;
generating a prospect detail window overlaid on the prospect map on a display;
wherein the at least one identifier is selectable, the prospect detail window being displayed when a user selects the selectable identifier, and
wherein the prospect detail window comprises a listing of at least one tenant located at a location of at least one identifier of at least one specific customer and one or more additional information about the at least one tenant.

17. The method of claim 16, wherein the at least one identifier comprises an identifier configured to display a color coded to indicate a projected value associated with the at least one specific customer obtaining the service.

18. The method of claim 16, wherein the first prospect criteria comprises an internal rate of return (IRR) projection based on the at least one specific customer obtaining the service, wherein the at least one identifier is displayed when the IRR projection meets an IRR threshold.

19. The method of claim 18, wherein the at least one identifier comprises an identifier configured to display a color coded identifier to indicate the IRR projection.

20. The method of claim 16, wherein the at least one identifier comprises an identifier configured to display a color coded identifier to indicate a cost to connect the customer to the technical infrastructure.

21. The method of claim 16, wherein the at least one identifier comprises an identifier configured to indicate there is a contact information for the at least one specific customer associated with the location.

22. The method of claim 16, further comprising wherein the one or more additional information about the at least one tenant comprises at least one of:
an internal rate of return (IRR) projection for the at least one specific customer;
a capital cost value of extending the technical infrastructure to the location of the at least one specific customer;
a distance from the technical infrastructure of the location of the at least one identifier of the at least one specific customer;
an indication of whether the at least one specific customer is directly connected to the technical infrastructure; and
an indication of whether the at least one specific customer is indirectly connected to the technical infrastructure.

23. The method of claim 22, wherein the at least one specific customer is displayed in accordance with a first prospect criteria and a second prospect criteria, wherein the first prospect criteria comprises a minimum current MMR and the second prospect criteria comprises a maximum current MMR.

24. The method of claim 22, wherein the at least one specific customer is displayed in accordance with a first prospect criteria and a second prospect criteria, wherein the first prospect criteria comprises a minimum potential MMR and the second prospect criteria comprises a maximum potential MMR.

25. The method of claim 22, wherein the at least one specific customer is displayed in accordance with a first prospect criteria and a second prospect criteria, wherein the first prospect criteria comprises a minimum distance from the technical infrastructure and the second prospect criteria comprises a maximum distance from the technical infrastructure.

26. The method of claim 22, wherein the at least one specific customer is displayed in accordance with a first prospect criteria and a second prospect criteria, wherein the first prospect criteria comprises a minimum capital cost value and the second prospect criteria comprises a maximum capital cost value.

27. The method of claim 22, wherein the first prospect criteria comprises a positive indication of whether a prospect is directly connected to the technical infrastructure.

28. The method of claim 22, wherein the first prospect criteria comprises a positive indication of whether a prospect is indirectly connected to the technical infrastructure.

29. The method of claim 22, further comprising:
connecting the computing device to an external memory via a network connection, wherein the external memory stores a copy of the cached geographic data and other geographic data for displaying any selected geographic area, a copy of the cached technical infrastructure data and other technical infrastructure data for displaying the technical infrastructure within the any selected geographic area, and a complete listing of identifiers including the cached listing of identifiers and other identifiers for displaying at least one identifier of at least one specific customer located within the any selected geographic area.

30. A system for identifying and efficiently navigating to a customer in a geographic area comprising:
  a computing device including a processor coupled to a display, a local memory, and an external memory, the local memory storing instructions for execution on the processor, the instructions configured to cause the processor to:
  load map data and customer data from a remote database;
  filter the loaded map data and the customer data using filter parameters;
  determine an absence of a connection between the computing device and a wireless network;
  in response to determining the absence, prevent the computing device from attempting to connect to any wireless network and generate a prospect map based on the loaded map data displaying:
  a selected geographic area;
  a technical infrastructure comprising network infrastructure required to support a telecommunication service within the selected geographic area;
  at least one identifier of at least one specific customer located within the selected geographic area, wherein the at least one specific customer requires access to the technical infrastructure in order to receive service, and wherein the at least one specific customer is displayed in accordance with a first prospect criteria;
  generate a prospect detail window overlaid on the prospect map on a display;
  wherein the at least one identifier is selectable, the prospect detail window displayed when a user selects the selectable identifier,
  wherein the prospect detail window comprises a listing of at least one tenant located at a location of at least one identifier of at least one specific customer and one or more additional information about the at least one tenant,
  wherein the external memory stores geographic data for displaying any selected geographic area, technical infrastructure data for displaying the technical infrastructure within the any selected geographic area, and a complete listing of identifiers for displaying at least one identifier of at least one specific customer located within the any selected geographic area,
  wherein the local memory pre-loads into a cache a portion of the geographic data, a portion of the technical infrastructure data, and a portion of the complete listing of identifiers, and
  wherein the cached portion of the geographic data, the cached portion of the technical infrastructure data, and the cached portion of the complete listing of identifiers are used to generate the prospect map.

31. The system of claim 30, wherein the one or more additional information about the at least one tenant comprises at least one of:
  an internal rate of return (IRR) projection for the at least one specific customer;
  a capital cost value of extending the technical infrastructure to the location of the at least one specific customer;
  a current monthly recurring revenue (MRR) of the at least one specific customer;
  a potential MMR of the at least one specific customer; and
  a distance from the technical infrastructure of the location of at least one identifier of at least one specific customer.

* * * * *